United States Patent [19]
Martin et al.

[11] Patent Number: 6,056,478
[45] Date of Patent: May 2, 2000

[54] PIPELAYING VESSEL AND A METHOD OF CONVERTING A MARITIME VESSEL TO A PIPELAYING VESSEL

[75] Inventors: Robert George Martin, Oldmeldrum; Philip Vaughn Thomas, Stonehaven, both of United Kingdom

[73] Assignee: Coflexip Stena Offshore Limited, United Kingdom

[21] Appl. No.: 08/696,888

[22] PCT Filed: Feb. 20, 1995

[86] PCT No.: PCT/GB95/00351

§ 371 Date: Oct. 4, 1996

§ 102(e) Date: Oct. 4, 1996

[87] PCT Pub. No.: WO95/22484

PCT Pub. Date: Aug. 24, 1995

[30] Foreign Application Priority Data

Feb. 19, 1994 [GB] United Kingdom ................... 9403216

[51] Int. Cl.[7] .................................................. B63B 35/03
[52] U.S. Cl. ........................................ 405/168.3; 405/158
[58] Field of Search .................................. 405/166, 168, 405/158, 159, 160, 161, 162, 163, 164, 165, 173

[56] References Cited

U.S. PATENT DOCUMENTS

| | | |
|---|---|---|
| 3,860,122 | 1/1975 | Cernosek . |
| 3,982,402 | 9/1976 | Lang . |
| 4,230,421 | 10/1980 | Springett . |
| 4,321,720 | 3/1982 | Havre . |
| 4,340,322 | 7/1982 | Springett et al. .................... 405/166 X |
| 4,687,376 | 8/1987 | Recalde . |
| 4,765,776 | 8/1988 | Howson .............................. 405/166 X |
| 4,820,082 | 4/1989 | Recalde ............................. 405/166 X |
| 4,961,677 | 10/1990 | Recalde ................................. 405/168.3 |
| 4,984,934 | 1/1991 | Recalde ............................. 405/166 X |
| 5,013,186 | 5/1991 | Kakizaki ................................. 405/166 |

FOREIGN PATENT DOCUMENTS

| | | |
|---|---|---|
| 93 06402 | 4/1993 | European Pat. Off. . |
| 2214259 | 8/1989 | Germany . |
| 2224803 | 5/1990 | Germany . |
| 2283297 | 5/1995 | Germany . |
| 1231587 | 12/1996 | Germany . |
| 1507959 | 4/1978 | United Kingdom . |
| 93/06402 | 4/1993 | WIPO . |

OTHER PUBLICATIONS

"The Reel Pipelay Ship—A New Concept," Offshore Technology Conference, Paper No. 2400, May 1975.

*Primary Examiner*—David J. Bagnell
*Assistant Examiner*—Frederick Lagman
*Attorney, Agent, or Firm*—Ostrolenk, Faber, Gerb & Soffen, LLP

[57] ABSTRACT

A reel pipelaying vessel of the type having a main pipeline reel (118) mounted for rotation about a horizontal axis, a variable angle pipeline launching ramp (128) having pipeline straightening and tensioning means mounted thereon and having: an improved pipeline launching ramp arrangement including rack and pinion elevator means (140, 142, 144); an improved level winding mechanism for translating the pipeline straightening and tensioning means as the pipe is spooled onto or unspooled from the reel; sea fastening means for restraining axial movement of the reel while the vessel is in transit, thereby increasing the maximum pipeline load for reel bearings (114, 116) of a given load capacity; sponsons (108, 110) for providing additional flotation and strengthening the hull; an improved arrangement of auxiliary reels (120); a cantilever structure (200) for guiding auxiliary lines, providing access to the main reel and protecting the bridge (218) of the vessel; improved pipeline abandonment and recovery arrangements; an improved reel structure; and an improved pipeline clamping arrangement. A method of converting an existing vessel to a reel pipelaying vessel is also described.

37 Claims, 13 Drawing Sheets

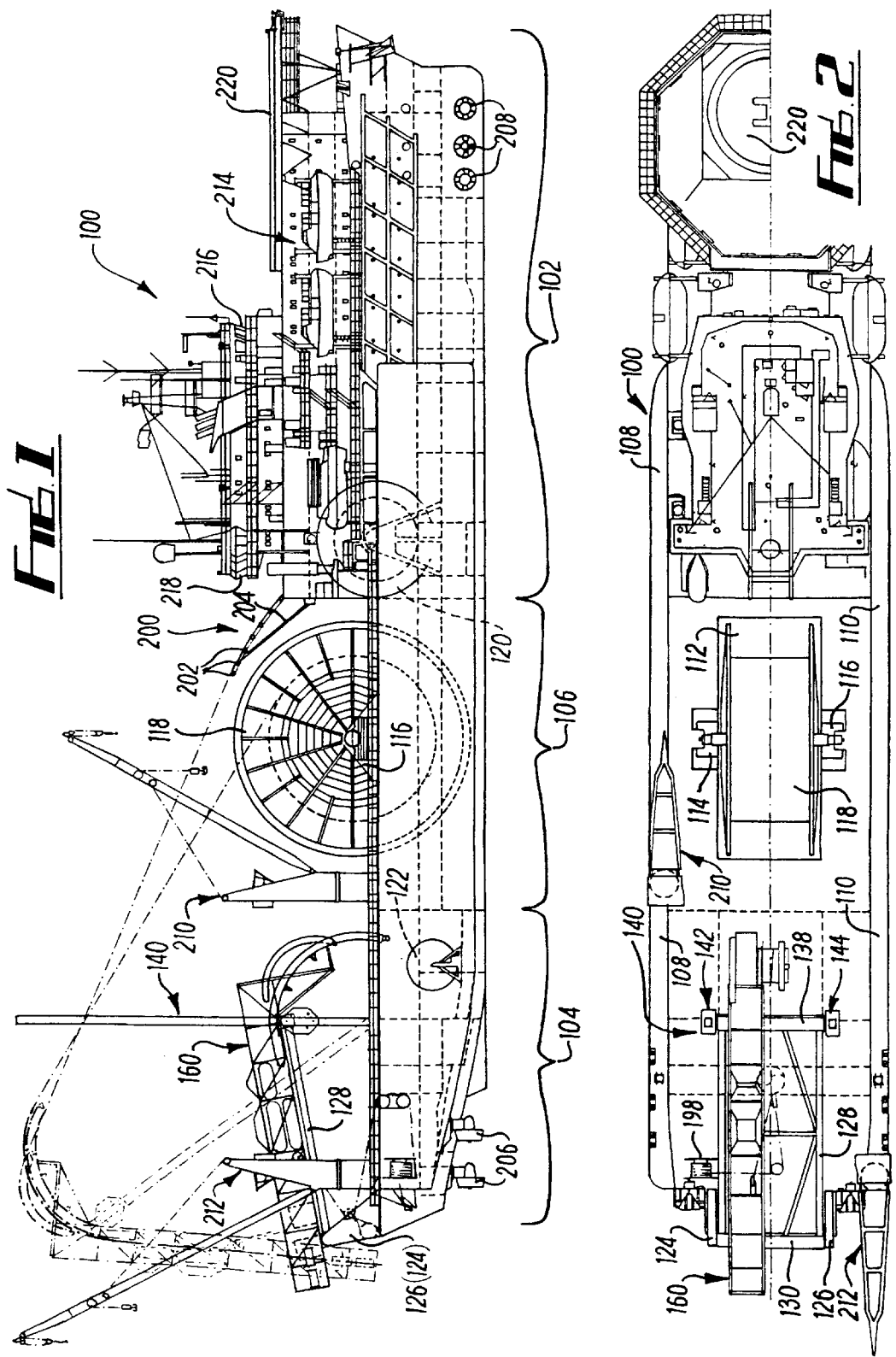

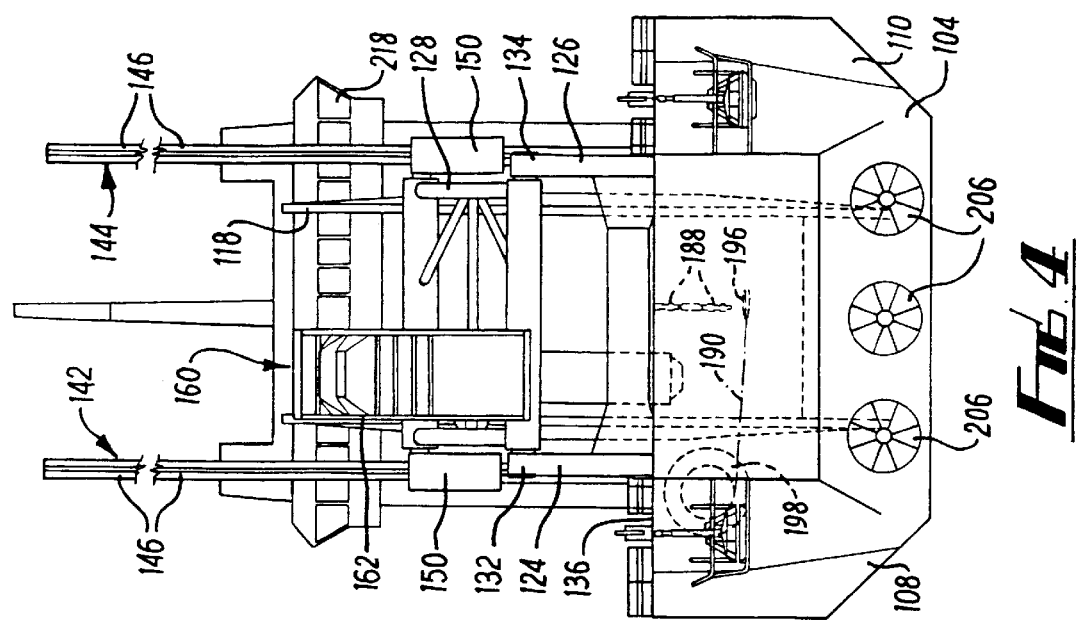
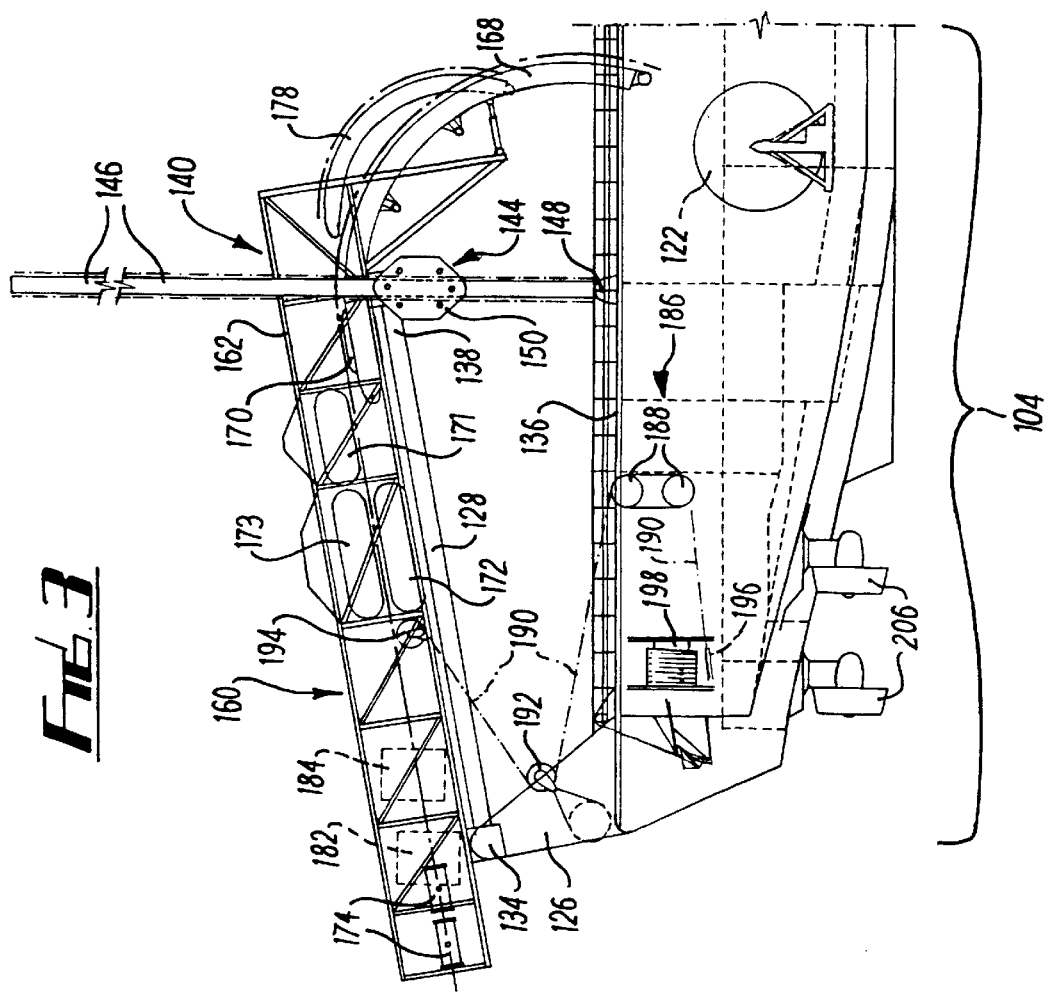

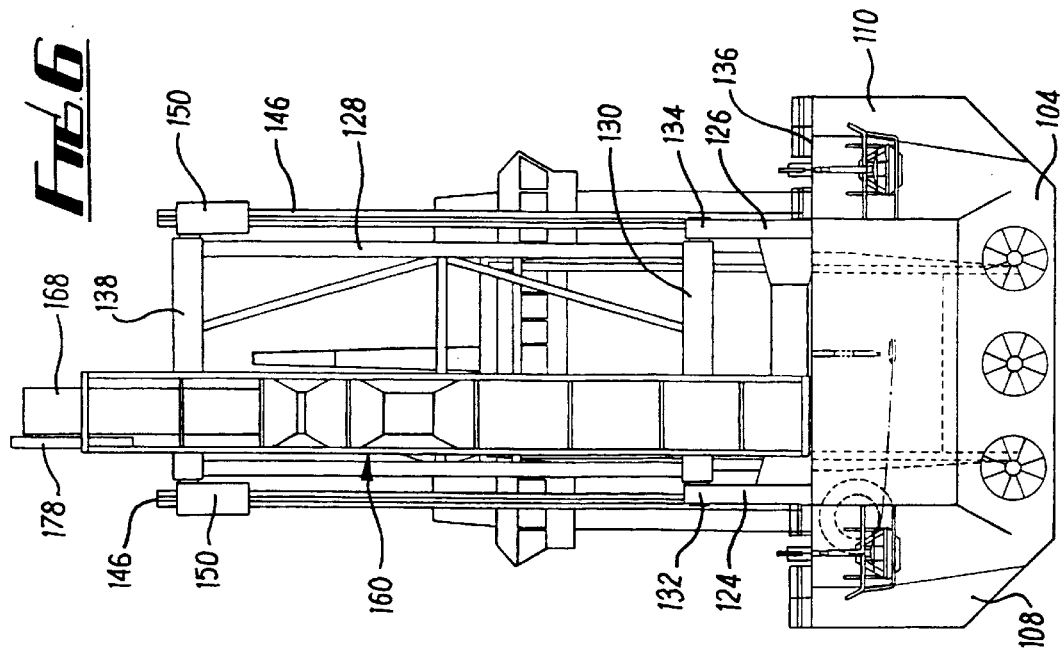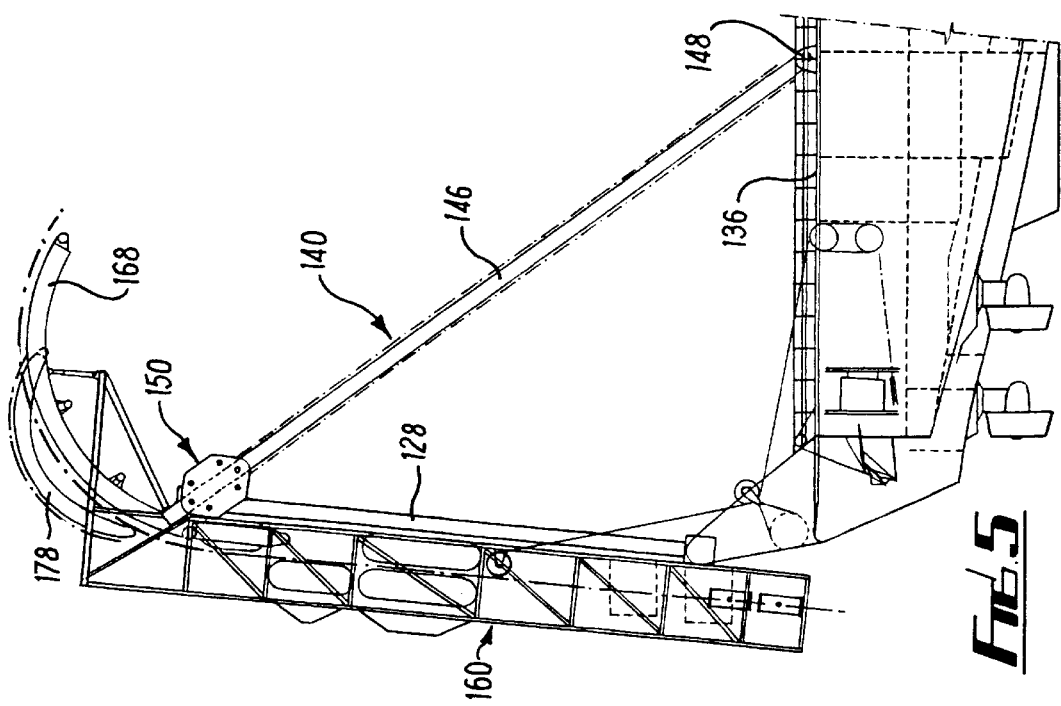

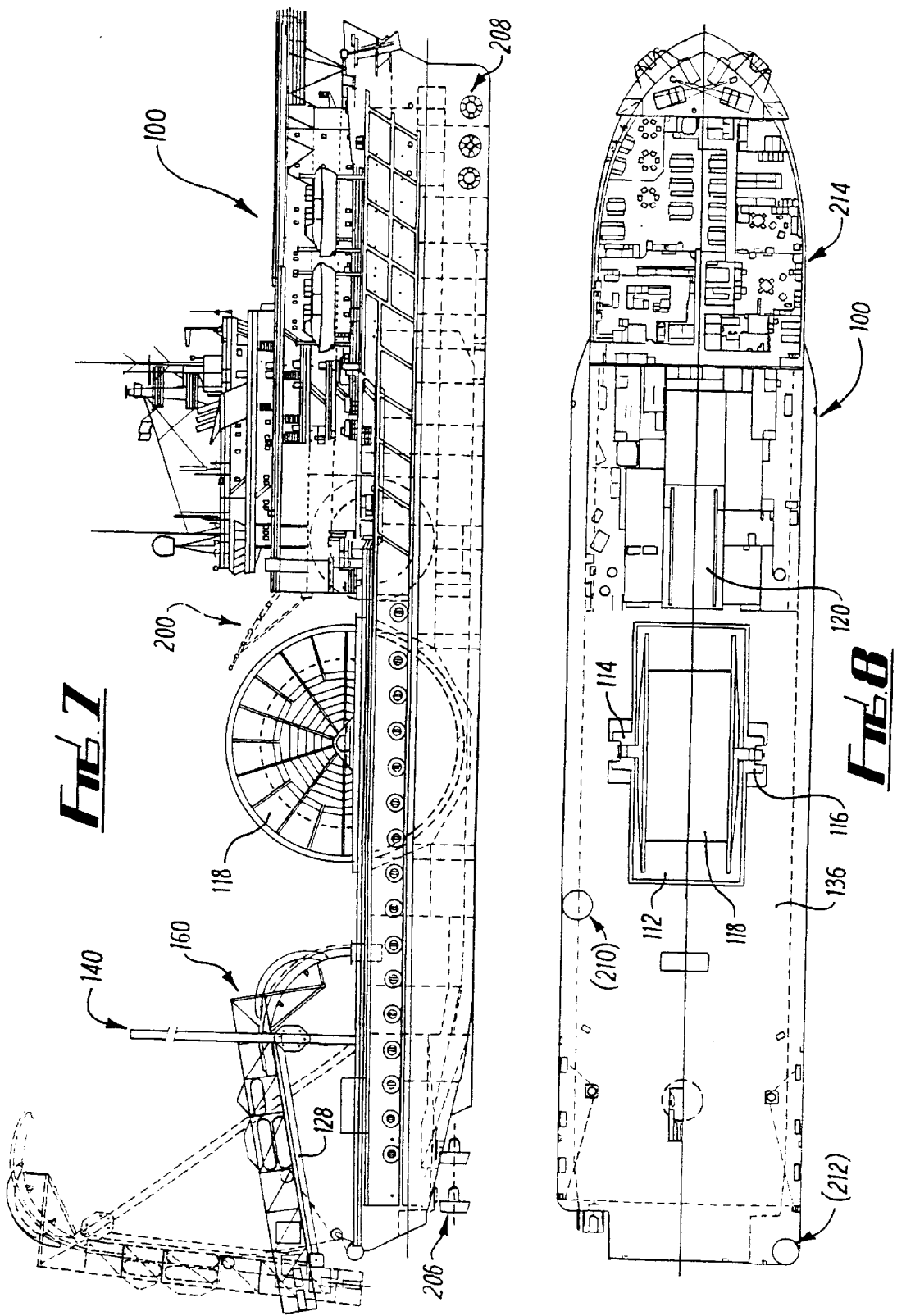

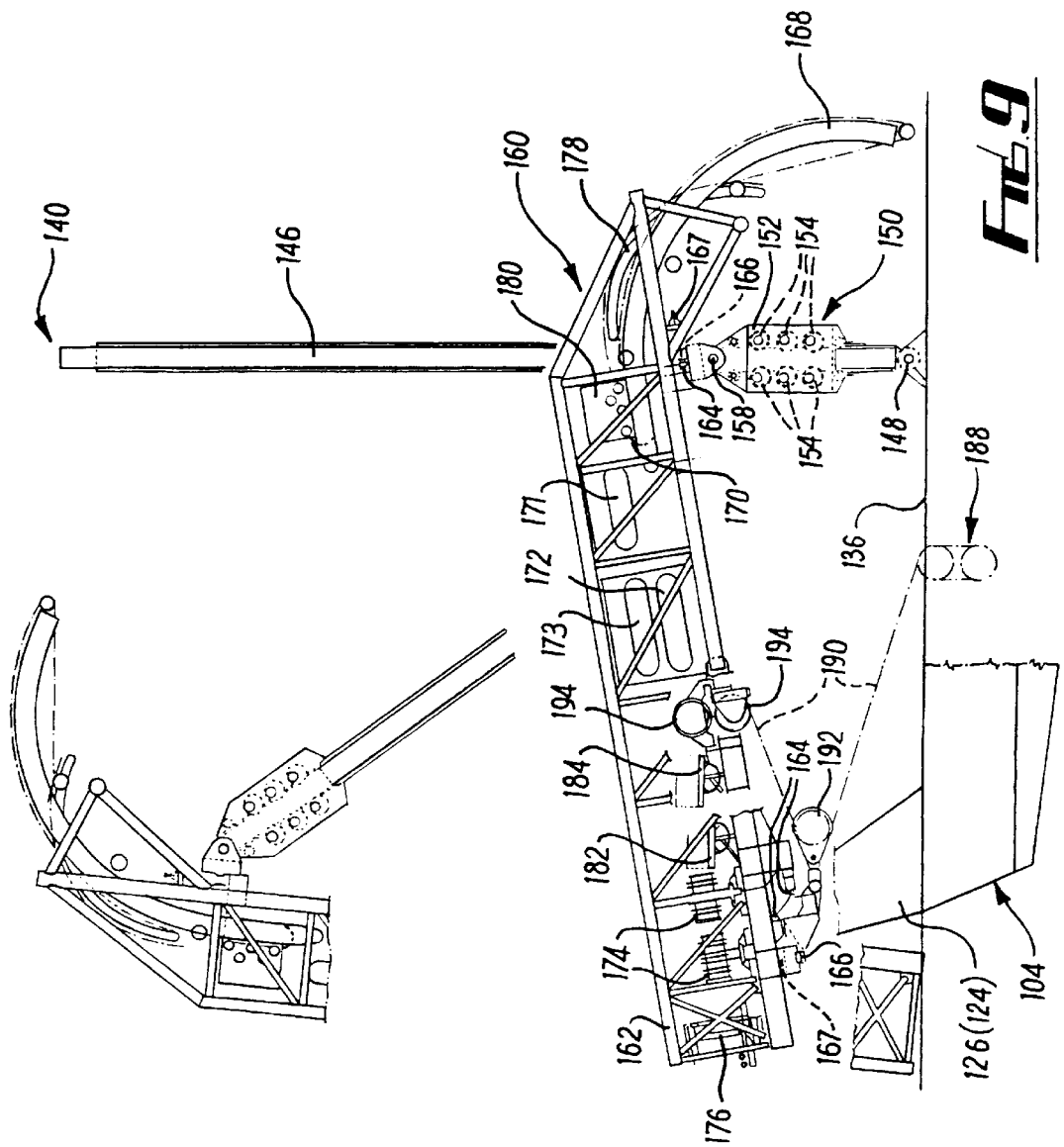

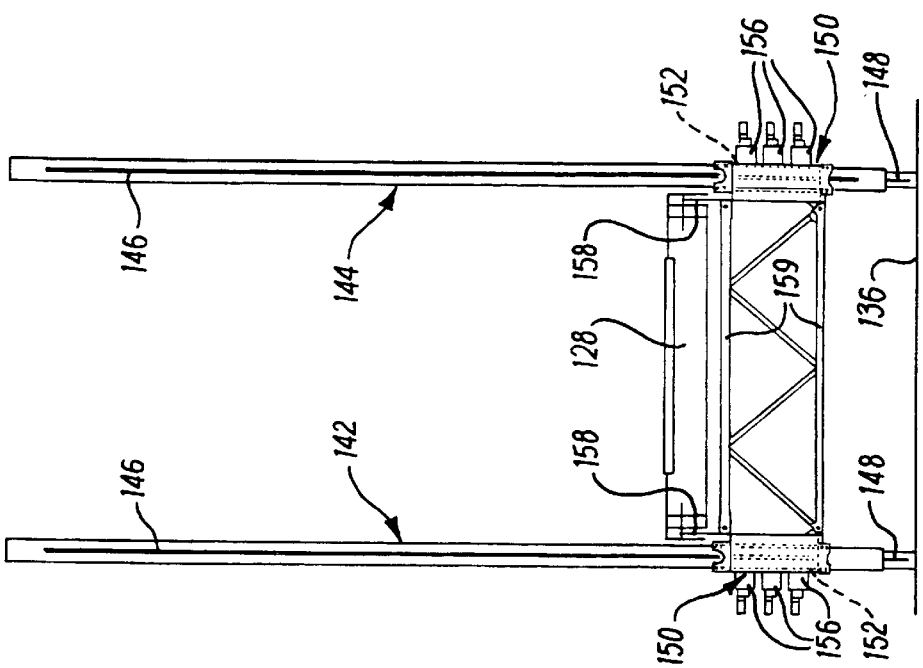
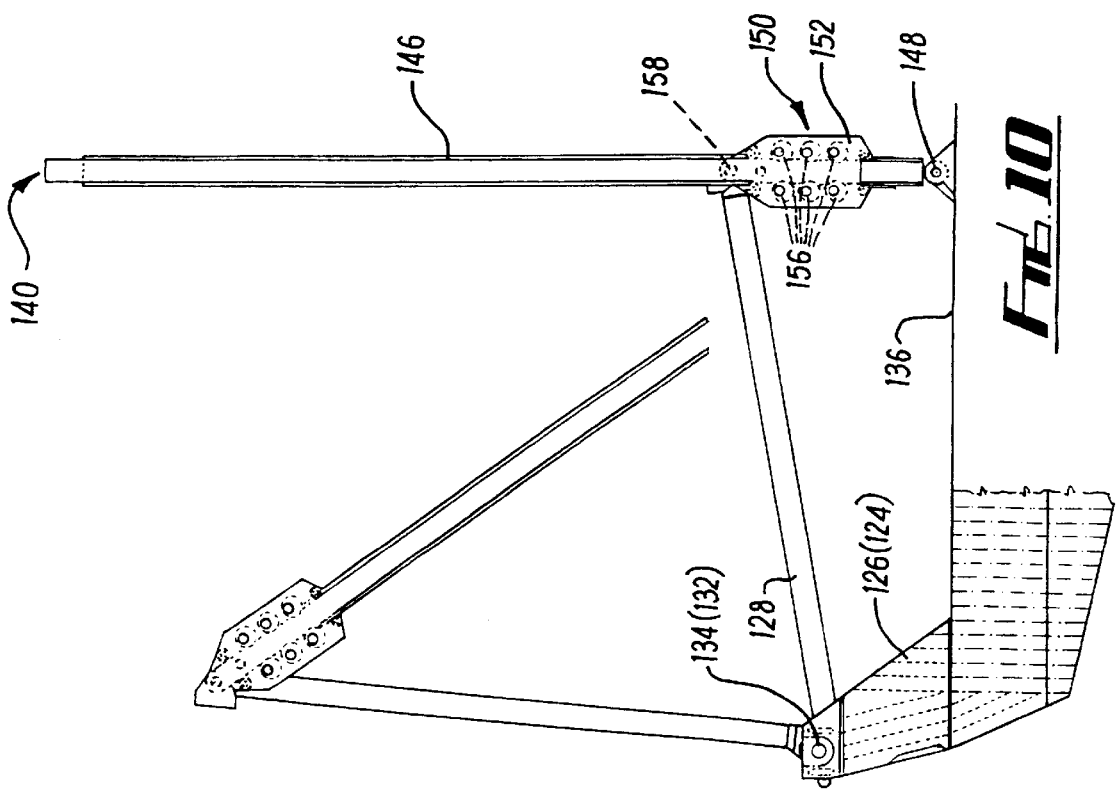

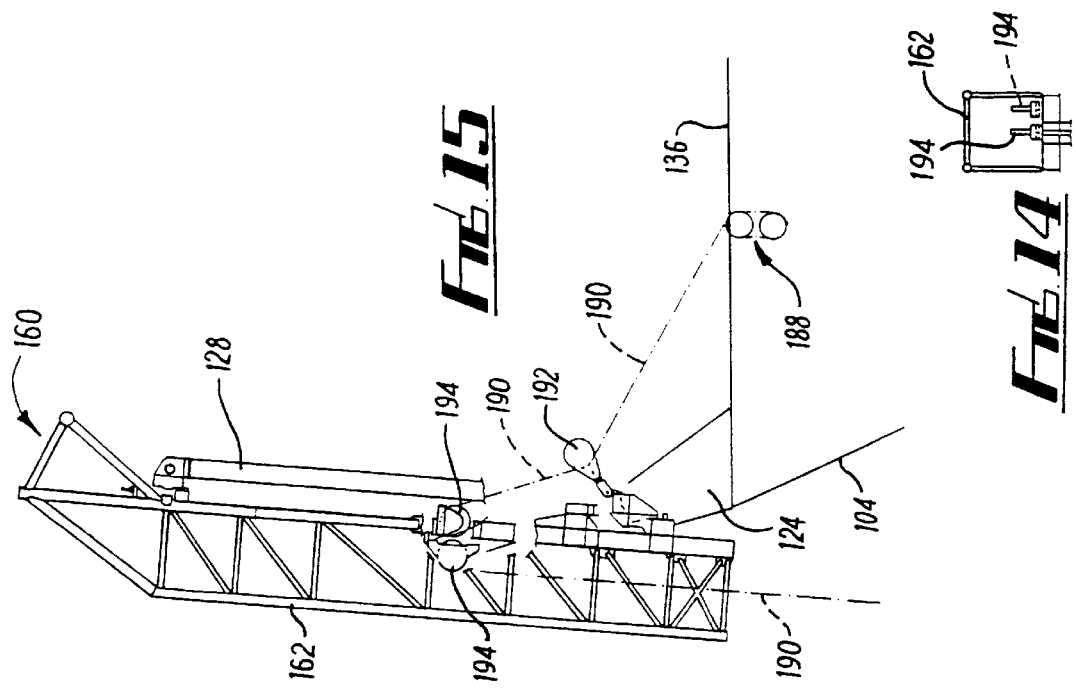
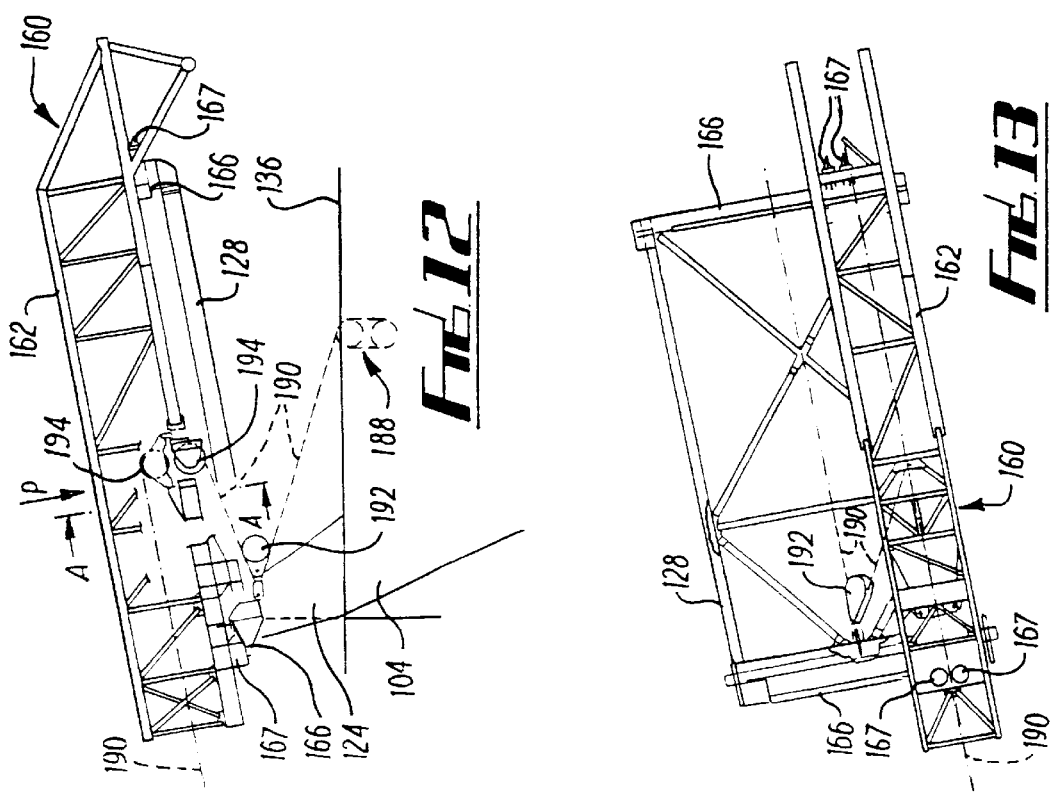

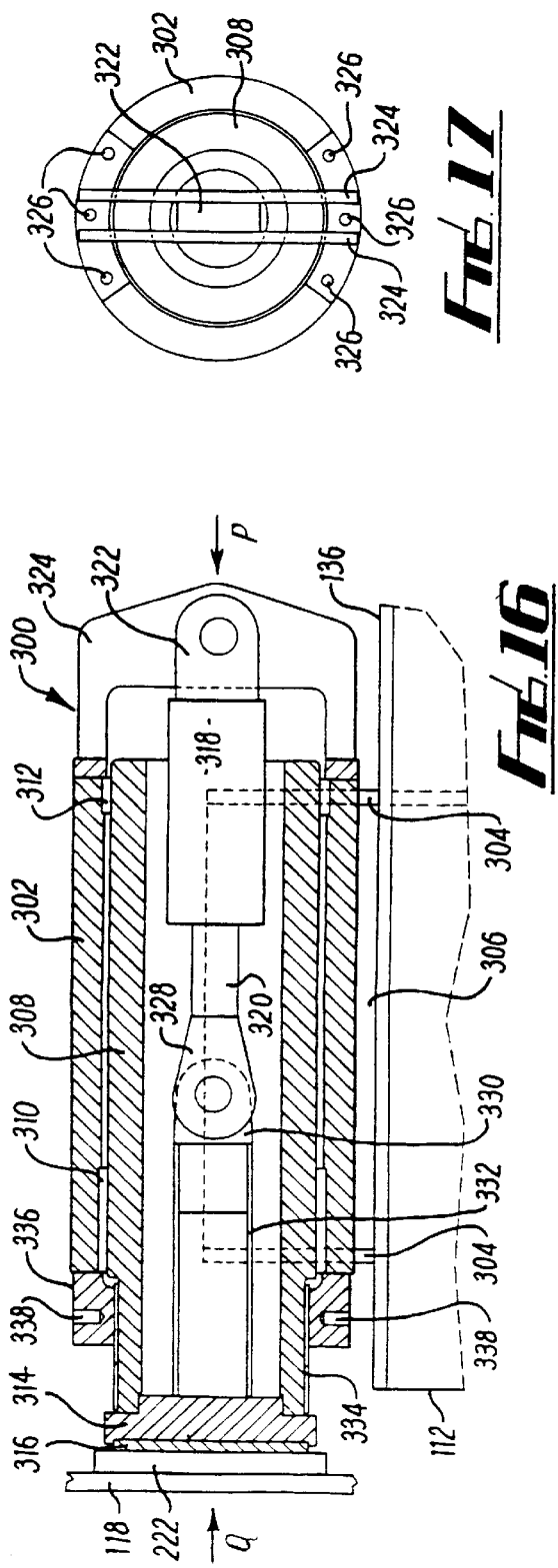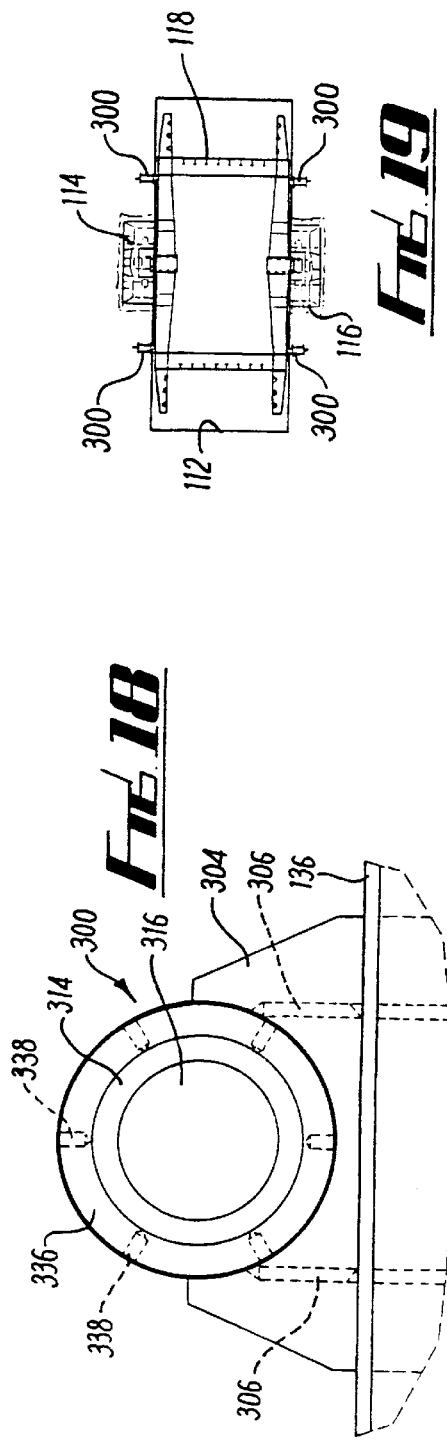

PIPELAYING VESSEL AND A METHOD OF CONVERTING A MARITIME VESSEL TO A PIPELAYING VESSEL

This invention relates to a pipelaying vessel, and more specifically but not exclusively relates to a self-propelled and dynamically-positioned reel pipelaying ship in which a pipe-spooling reel and associated pipe handling equipment are integrated into the structure of the ship. In some embodiments of the pipelaying ship, there is provision for the simultaneous laying of a plurality of pipes, or the simultaneous laying of one or more pipes together with one or more cables.

In prior-art pipelaying vessels as employed in laying offshore subsea pipelines for such uses as the gathering of oil and/or gas from offshore subsea wells, as, for example, in the Gulf of Mexico, it has been conventional to use one of two main methods to lay the pipe. In the first, or "stovepiping", method, a pipeline is fabricated on the deck of a lay barge by welding together individual lengths of pipe as the pipe is paid out from the barge. Each length of pipe is about 40 feet or 80 feet long. Thus, the pay-out operation must be interrupted periodically to permit new lengths of pipe to be welded to the string. The stovepiping method requires that skilled welders and their relatively bulky equipment accompany the pipelaying barge crew during the entire laying operation; all welding must be carried out on site and often under adverse weather conditions. Further, the stovepiping method is relatively slow, with experienced crews being able to lay only one or two miles of pipe a day. This makes the entire operation subject to weather conditions which can cause substantial delays and make working conditions quite harsh. (A modification of the stovepiping technique known as the "J-lay" technique allows the laying of pre-assembled pipestrings up to 240 feet in length, but pipelaying is still discontinuous).

The other principal conventional method is the reel pipelaying technique. In this method, a pipeline is wound on the hub of a reel mounted on the deck of a lay barge. Pipe is generally spooled onto the reel at a shore base. There, short lengths of pipe can be welded under protected and controlled conditions to form a continuous pipeline which is spooled onto the reel. The lay barge is then towed to an offshore pipelaying location and the pipeline spooled off the reel between completion points. This method has a number of advantages over the stovepiping method, among them, speed (up to one mile per hour); lower operating costs (eg smaller welding crews and less welding equipment must be carried on the lay barge); and less weather dependency.

Historically, the technique of laying undersea fluid-carrying pipelines had its rudimentary beginnings in England in the 1940's in a War-time project known as "Operation Pluto". In the summer of 1944, 3-inch nominal bore steel tubes, electrically flash-welded together, were coiled around floating drums. One end of the pipe was fixed to a terminal point; as the floating drums were towed across the English Channel, the pipe was pulled off the drum. In this manner, pipeline connections were made between the fuel supply depots in England and distribution points on the European continent to support the Allied invasion of Europe. (See Blair, J S, "Operation Pluto: The Hamel Steel Pipelines", Transactions of the Institute of Welding, February 1946).

The broad concept of reel pipelaying was also disclosed in British Patent No. 601,103 wherein it was suggested that lengths of pipe can be joined together at the manufacturing plant and coiled onto a drum, mounted on a barge or ship; the loaded barge would then be moved to the desired marine location and the pipe unwound from the drum by fixing one end of the pipe and towing the barge away from the fixed location.

While the concepts described in British Patent No. 601,103 and those actually used in Operation Pluto were adequate for wartime purposes, no known further development work or commercial use of the technique of laying pipe offshore from reels was carried out after World War II. After a hiatus of about fifteen years, research into the reel pipelaying technique was renewed and was carried on by Gurtler, Herbert & Co, Inc of New Orleans, La. (USA); by 1961, Gurtler, Herbert had sufficiently advanced the reel pipelaying technique to make it a commercially acceptable and viable method of laying pipe for the offshore petroleum industry, able to compete with the traditional stovepiping technique. The first known commercial pipelaying reel barge, called the U-303, was built by Aquatic Contractors and Engineers, Inc, a subsidiary of Gurtler, Herbert, in 1961. The U-303 utilised a large vertical-axis reel, permanently mounted on a barge and having horizontally orientated flanges (generally referred to in the trade as a "horizontal reel"). A combined straightener/level winder was employed for spooling pipe onto the reel and for straightening pipe as it was unspooled. The U-303 first laid pipe commercially in September 1961, in the Gulf of Mexico off the coast of Louisiana and was used successfully during the 1960's to lay several million linear feet of pipe of up to 6 inches diameter. The U-303 reel pipelaying barge is described in U.S. Pat. No. 3,237,438 (Tesson) and U.S. Pat. No. 3,372,461 (Tesson).

The successor to the U-303, currently in use in the Gulf of Mexico and known in the trade as the "Chickasaw", also utilises a large horizontal reel, permanently mounted on the barge such that it is not readily movable from one carrier vessel to another. Various aspects of "Chickasaw" are described in the following U.S. Patents:

Sugasti, et al—U.S. Pat. No. 3,630,461

Gibson—U.S. Pat. No. 3,641,778

Mott et al—U.S. Pat. No. 3,680,432

Key et al—U.S. Pat. No. 3,712,100

Commercial reel pipelaying techniques require the use of certain pipe handling equipment in addition to the reel. Among such pipe handling equipment essential to any commercial reel pipelaying system is a straightener mechanism. This may take the form of a series of rollers or tracks, or any other arrangement which imparts sufficient reverse bending force to the pipe to remove residual curvature such that after unspooling, the pipe will lay substantially straight on the sea bottom. No such pipe-conditioning apparatus was used in "Operation Pluto" or contemplated in the British Patent No. 601,103.

U.S. Pat. Nos. 3,982,402 and RE30486 (Lang et al) describe an apparatus for laying pipe from a vertical reel in which the pipe conditioning apparatus is pivotable to adjust the lift-off angle of the pipe relative to the horizontal (eg the deck of a ship) as a function of the water depth in which the pipe is being laid. This has distinct commercial advantages, especially where the reel pipelaying system is incorporated into a self-propelled ship capable of travelling to different job sites, having different pipe size and/or lay depth requirements.

An early concept for a reel pipelaying ship is described in Goren, et al, "The Reel Pipelay Ship—A New Concept", Offshore Technology Conference Proceedings, May 1975 (Paper No OTC 2400). This paper (hereinafter the Goren, et al 1975 OTC Paper) described advantages and operating features of a proposed reel pipelaying ship. However, the cost of construction of a ship as described there was estimated to be of the order of $100,000,000.

The research and development work for the ship described in the Goren, et al paper was subsequently materially revised in numerous major respects, and substantial changes and improvements were made to achieve the design of a substantially different reel pipelaying ship which is described in the following U.S. Pat. Nos.:

Springett, et al—U.S. Pat. No. 4,230,421
Uyeda, et al—U.S. Pat. No. 4,269,540
Yenzer, et al—U.S. Pat. No. 4,297,054
Springett, et al—U.S. Pat. No. 4,340,322
Uyeda, et al—U.S. Pat. No. 4,345,855

The vessel described in these Patents was constructed and is currently in use in various offshore oil fields, being known in the offshore oil industry as the "Apache" (now re-named the "Stena Apache"). This vessel is a self-propelled dynamically-positioned reel pipelaying ship which has a specially-constructed hull comprising a reel support structure for rotatably mounting a vertical reel for unspooling a rigid-walled pipeline. Only a single pipeline was originally handled by this ship, though the "Apache" was subsequently modified by the addition of an auxiliary reel positioned forward of the main reel to enable the laying of "piggyback" lines strapped to the main pipeline. Other pipe handling equipment includes a pipe bending radius controller; pipe straightening equipment; clamping assemblies; a stern pipe guide assembly and a level wind assembly. A tensioning assembly is also arranged on a support ramp assembly. The pipe exit angle or the water entry angle is from 18° to about 60° since this is the range of angular movement of the support ramp assembly. The upper part of this range of the pipe water entry angles is sufficient to accommodate laying a single pipeline in approximately 3,000 feet water depth. In order to lay pipe at greater depths it is necessary to increase the pipe water entry angle.

The "Stena Apache" vessel is not equipped to lay multiple lines since it has but a single main reel and does not have adequate unused deck space to permit the convenient placement of auxiliary reels. An early suggestion which was made during the vessel's construction phase and mentioned in the above Patents, was that portable reels could be placed on the "Apache" deck to permit stern bundling of smaller lines with the pipeline from the main reel. These smaller lines were not required to be passed through the pipe handling equipment with the main reel pipeline according to the suggestion and there were no operative disclosures as to forming a juxtaposed plurality of operational lines by contact with a laying device which is adapted to move all the lines at a common velocity. This stern bundling suggestion was made in the OTC Paper No. 3069, May 8–11, 1978.

There are increasing requirements in the offshore petroleum industry for laying single or multiple operational lines in deep water at depths greater than 3,000 feet and in remote areas far from supply bases. To be commercially viable a pipelaying vessel should preferably also be capable of laying either single or multiple operational lines in shallow waters of less than 2,000 feet up to 3,000 feet depth. The reel pipelaying vessel of this invention (as defined below) represents a new and different concept for meeting these needs.

It is also desirable that the stern deck space around the pipelaying equipment be more easily and safely accessible.

While it is technically feasible to design and build a ship specifically to provide several or all of the abovementioned desirable features, such a ship would be relatively expensive. On the other hand, there are many sea-going vessels that are currently surplus to requirements and hence available at relatively low cost such that the cost of conversion to reel-lay capacity is potentially more economical than new-build. However, selection of a vessel to be modified, and the actual modification procedures, require to be individually and collectively controlled in non-obvious ways to avoid excessive costs and unsatisfactory results.

Certain aspects of the present invention will also be shown to be applicable to new-build vessels, and/or to retrofitting/upgrading an existing pipelaying vessel.

According to a first aspect of the present invention there is provided a reel pipelaying vessel, said vessel being fitted with a dynamic positioning system (DPS), said vessel being provided with a reel-holding well at a location amidships, said vessel being provided with reel-mounting bearings on laterally opposite sides of said well, and said vessel being provided with ramp-mounting bearings at a sternwards location on said vessel for the mounting of a pipe-launching ramp thereon.

Said vessel is preferably formed with a hull and may be provided with supplementary flotation means which preferably comprises hull-contiguous sponsons. Such sponsons may extend along at least a greater part of the length of the hull. Said sponsons are preferably so formed and attached to the hull as to constitute longitudinal strengthening members for the vessel to assist the vessel to withstand loads imposed in use of the vessel through said reel-mounting bearings.

Said reel pipelaying vessel preferably further comprises a pipe-spooling reel temporarily or permanently rotatably mounted on said reel-mounting bearings. Said pipe-spooling reel preferably includes first and second lateral side portions each comprising a central rotary bearing, a plurality of radial spokes extending outwardly from said central rotary bearing and a main flange surface connecting at least the outer portions of said spokes, the reel further including a hub surface connecting said lateral side portions such that said reel, in radial cross-section, has a portal frame configuration, there being no central shaft connecting the rotary bearings of the respective side portions.

Said reel pipelaying vessel preferably further comprises a pipe-launching ramp temporarily or permanently mounted on said ramp-mounting bearings. The mounting of said ramp is preferably a rotational mounting whereby the elevation of the ramp with respect to the vessel is variable, said vessel preferably further comprising ramp elevation control means for controllably varying the elevation of the ramp. Said ramp elevation control means preferably comprises variable-length ramp support means anchored at or adjacent one end thereof upon fixed structure of the vessel and at or adjacent the other end of a variable length portion of the support to the ramp at a location thereon not adjacent said rotational mounting of said ramp. Said variable-length ramp support means preferably comprises a pair of rack and pinion elevators located one on each side of said ramp and conjointly operable to vary the elevation of said ramp with respect to said vessel.

Said pipe-launching ramp preferably comprises a pipe radius control means for imparting a substantially uniform radius of curvature to a length of pipe de-spooled from said reel in pipelaying operation of said vessel.

Said pipe-launching ramp preferably comprises level-wind means for accommodating variations in the lateral positioning of a length of pipe spooled onto said reel as a plurality of side-by-side turns, during spooling and de-spooling of said length of pipe. Said level-wind means and said pipe radius control means are preferably mounted and controlled for conjoint lateral movement, preferably by said pipe radius control means being mounted upon said level-wind means for carriage thereby.

The combination of said pipe-launching ramp and said ramp-mounting bearings is preferably such that the underside of said pipe-launching ramp is clear of underlying deck of the reel pipelaying vessel, at least between said ramp-mounting bearings and such part or parts of the deck at which ramp elevation control means is anchored. The deck to ramp underside clearance is preferably at least sufficient to constitute walk-under headroom. Within said combination, said ramp-mounting bearings are preferably arranged to dispose a horizontal pivot axis for the ramp substantially above said underlying deck whereby thus to provide at least the greater part of said clearance.

Said reel pipelaying vessel may be provided with one or more auxiliary reels for the spooling/de-spooling of cable(s) and/or auxiliary pipe(s), the auxiliary reel(s) preferably being laterally aligned with the main pipe reel, and conveniently located substantially on the longitudinal centre-line of the vessel fore and/or aft of the main pipe reel. Where the auxiliary reel or at least one of the auxiliary reels carries or is intended to carry a plastically deformable auxiliary pipe or cable, the pipe-launching ramp may be formed with or provided with a respective auxiliary radius control means for imparting a substantially uniform radius of curvature to said auxiliary pipe or cable. Where at least one auxiliary reel is located forward of the main pipe reel, said pipelaying vessel may be provided with a fixed cantilever or other bridging structure leading auxiliary pipe/cable to/from the auxiliary reel(s) from/to the pipe-launching ramp in a path extending over and clear of the path of pipe between said ramp and the main reel. Said fixed cantilever or other bridging structure is preferably provided with an array of rollers or other suitable means for facilitating passage of the auxiliary pipe/cable thereover.

Said reel pipelaying vessel is preferably provided with restraint means selectively operable on at least the main pipe reel to provide at least lateral restraint of said main reel while said main reel is not required to rotate, whereby to relieve the reel bearings of at least some lateral loading when said restraint means is applied. Said restraint means preferably comprises an array of chocks which can be selectively pressed against or retracted from opposite sides of the reel on either side of the rotation axis thereof whereby selectively to apply lateral clamping forces on the reel. Each chock preferably comprises a hydraulically extendable strut lockable in its extended condition by means of a screw-threaded fastener. Each said chock is preferably anchored at one end thereof to the reel-holding well and/or to vessel decking adjacent thereto, and each said chock is preferably provided at the other end thereof with a reel-contacting surface of reduced friction, for example a bronze pad.

The reel pipelaying vessel is preferably further equipped with an abandonment and recovery system (A&R system) comprising a winch/wire/sheave arrangement extending a haulage wire (or rope, chain, or cable) from a suitably located winch by way of one or more sheaves to extend down the pipe-launching ramp so as to enable the end of a pipe being laid to be let overboard in a controllable fashion, and to facilitate the pulling on-board of a pipe end. The winch haulage drum is preferably anchored within the vessel. The sheave arrangement preferably includes one sheave located adjacent the ramp-mounting bearings to give the A&R system a measure of level luffing, and at least one further sheave disposed on the ramp at a location substantially displaced from the sternwards end of the ramp to bring the haulage wire into a path extending down the ramp from said location on the ramp. The sheaves preferably have articulated anchorage to cope with level winding traverses and variable ramp elevations. The sheaves are preferably wide-bodied to allow the passage of wire rope fittings and shackles incorporated into the A&R system.

The vessel preferably further includes pipeline clamping means located adjacent the aft end of a pipeline launching ramp, said clamping means comprising
   at least a first clamp of generally cylindrical configuration mounted on said ramp by clamp mounting means, said first clamp comprising first and second semi-cylindrical portions hinged together along their lengths on a side of the clamp disposed below the pipeline path.

Preferably also, said clamp mounting means is adapted to be retractable such that said first clamp may be retracted to a position below the pipeline path when not in use.

Preferably also, said clamp mounting means has a load capacity greater than the load capacity of said first clamp, whereby the clamp load capacity may be increased up to the capacity of said clamp mounting means by securing one or more additional clamps to the pipeline in abutment with the first clamp and upstream therefrom in the direction of pipeline unspooling.

According to a further aspect of the present invention there is provided a pipe-launching ramp, said ramp comprising a planar frame having bearing means at or towards one end thereof for rotatably mounting the ramp on ramp-mounting bearings of a pipelaying vessel, and coupling means located at or towards the other end of the frame for coupling of the ramp to a ramp elevation control means for controllably varying the elevation of the ramp.

Preferably, said ramp elevation control means comprises variable-length ramp support means adapted to be anchored at or adjacent one end thereof upon fixed structure of the vessel and at or adjacent the other end of a variable length portion of the support to the ramp at a location thereon not adjacent said rotational mounting of said ramp.

Preferably also, said variable-length ramp support means comprises a pair of rack and pinion elevators located one on each side of said ramp and conjointly operable to vary the elevation of said ramp with respect to said vessel.

Preferably also, said pipe-launching ramp comprises a pipe radius control means for imparting a substantially uniform radius of curvature to a length of pipe de-spooled from said reel in pipelaying operation of said vessel.

Preferably also, said pipe-launching ramp comprises level-wind means for accommodating variations in the lateral positioning of a length of pipe spooled onto said reel as a plurality of side-by-side turns, during spooling and de-spooling of said length of pipe.

Preferably also, said ramp includes at least two levelwind-mounting crossbeams; said levelwind means comprising a rectangular lattice mounted for lateral movement on said crossbeams, lateral movement control means for laterally moving said lattice on said crossbeams, radius control means carried on said lattice for imparting a uniform curvature to a pipe being de-spooled over said ramp, and pipe gripping means carried by said lattice for gripping a pipe being de-spooled over said ramp to apply straightening and/or tensioning forces to said pipe.

As compared to the pipe-launching ramps described in WO93/06401 and WO93/06402 wherein a flexible levelwind is mounted on five transverse rails on a wide stiff truss, in the present invention the levelwind is constructed as a stiff rectangular lattice running on two crossbeams carried by a ramp which is simply a planar frame, this arrangement being lighter than the abovementioned prior art for a given load capacity.

The levelwind lattice can be boxed in or surrounded to provide full weather protection, and is preferably equipped with a dual bulkhead/platform system to provide a working location which allows personnel to work on the lattice whether the ramp is near horizontal or near vertical. Access to the working location can be by a ladder system on one side of the levelwind and/or by a man-carrying lift on the other side of the levelwind.

The radius control means and the pipe gripping means can be as described in the abovementioned PCT publications, but a preferred ramp elevator in accordance with part of the present invention, for controllably varying the inclination of the ramp, is very different in that the preferred ramp elevator has its lower end(s) at a fixed location(s) on the vessel rather than travelling along deck rails in the above PCT publications; this arrangement of the present invention concentrates ramp-elevating loads at discrete points, thereby minimizing the required extent of under-deck stiffening and hence cost.

According to a further aspect of the present invention there is provided a reel-clamping chock for clamping a pipe-carrying reel against movement thereof in an axial direction, said chock comprising a power-extendable jack, selectively operable locking means for locking said jack in an extended configuration thereof, coupling means at one end of the chock for coupling that end of the chock to an anchorage, and reel-contacting means at the other end of the chock for the application of jacking force to said reel.

Said power-extendable jack is preferably a hydraulic jack, conveniently realised as a piston and cylinder assembly.

Said selectively operable locking means is preferably a screw-threaded nut or an internally screw-threaded ring which can be screwed along one part of said jack, after extension of said jack, to bear against another part of said jack which has been extended relative to said one part whereby to lock said two parts against relative movement tending to reverse such extension.

Said reel-contacting means preferably comprises a friction-reducing means for contacting the reel in use of the chock. The friction-reducing means preferably comprises a bronze pad attached to or integral with said other end of the chock.

According to a further aspect of the present invention there is provided a reel-clamping chock array, said array comprising at least four reel-clamping chocks according to the previous aspect of the present invention, disposed so that a respective plurality of said chocks is extendable to contact each of the axially opposite ends of the reel, with at least one chock in each said plurality being disposed to be extendable to contact the respective end of the reel at a location thereon which is substantially diametrically opposite to a location on that end of said reel to which at least one other chock in the same plurality is extendable to contact that end of said reel, whereby said array may be operated in a manner to reduce or eliminate skewing forces imposed on said reel by application thereto of reel-clamping forces.

According to still another aspect of the present invention there is provided a combined pipe and/or cable bridge and personnel access gangway for fitting to a reel pipelaying vessel having a main pipe reel and an auxiliary pipe/cable reel located ahead of the main reel, said combined bridge/gangway comprising a cantilever support whose forward end is mountable at a location on said vessel intermediate said main reel and said auxiliary reel, such that said combined bridge/gangway extends rearward of said location towards and partly overlapping said main reel at an elevation with respect thereto that will carry auxiliary pipe and/or cable being unspooled from said auxiliary reel over said main reel and over pipe being unspooled from said main reel, said combined bridge/gangway having a longitudinally extending pipe transport means for carrying auxiliary pipe/cable thereover, said combined bridge/gangway further having a longitudinally extending walkway dimensioned and arranged for carrying pedestrians from said location or from near thereto at least to a point over said main reel.

Said combined bridge/gangway can be incorporated into a new-build reel pipelaying vessel or into the conversion of a maritime vessel to a reel pipelaying vessel, or said combined bridge/gangway can be provided as equipment for retrofitting onto an existing reel pipelaying vessel.

Said pipe transport means may comprise a longitudinally extending array of pipe/cable carrying rollers, or a longitudinally extending pipe/cable conveyor belt or chain.

The mounting of said cantilever support may be such that the general inclination of said combined bridge/gangway in a longitudinal direction is either fixed or controllably variable.

According to still another aspect of the invention, there is provided a pipe-spooling reel for use in laying pipe from a reel pipelaying vessel, including first and second lateral side portions each comprising a central rotary bearing, a plurality of radial spokes extending outwardly from said central rotary bearing and a main flange surface connecting at least the outer portions of said spokes, the reel further including a hub surface connecting said lateral side portions such that said reel, in radial cross-section, has a portal frame configuration, there being no central shaft connecting the rotary bearings of the respective side portions.

According to still another aspect of the present invention there is provided a method of converting a maritime vessel to form at least the basis of a reel pipelaying vessel, said method comprising the steps of selecting a maritime vessel which either already has a dynamic positioning system (DPS) or is capable of being fitted with a DPS, providing said maritime vessel with a reel-holding well at a location amidships, providing said maritime vessel with reel-mounting bearings on laterally opposite sides of said well, and providing said maritime vessel with ramp-mounting bearings at a sternward location for the mounting of a pipe-launching ramp thereon.

The step of providing said maritime vessel with a reel-holding well at a location amidships may comprise a combination of the sub-steps of transversely dividing the maritime vessel at a selected location thereon, into a bow section and a stern section, mutually separating the bow section and the stern section, providing a reel-holding well section having a transverse cross-section substantially matching the transverse cross-section of the maritime vessel at said selected location thereon, placing the reel-holding well section between the bow section and the stern section, bringing the three said sections together and mutually securing them to form at least the basis of a reel pipelaying vessel having a substantially continuous hull line.

The maritime vessel may be provided with supplementary flotation means, preferably by the addition of laterally mounted sponsons which may extend for a substantial fraction of the total length of the reel pipelaying vessel. The sponsons are preferably integrated with underlying portions of the original hull of the maritime vessel, and the sponsons preferably extend upwardly at least sufficiently to ensure that the heeling limit of the reel pipelaying vessel is not substantially less than the heeling limit of the maritime vessel prior to conversion thereof.

Said method preferably comprises the further steps of providing said maritime vessel with a DPS if it does not already possess a DPS, providing a pipe-spooling reel and rotatably mounting said reel on said reel-mounting bearings, and providing a pipe-launching ramp and mounting said ramp on said ramp-mounting bearings. Said vessel is preferably further provided with ramp elevation control means for controllably varying the elevation of the ramp.

Said maritime vessel may be a diving support vessel (DSV) or any other form of maritime vessel suitable for conversion to a reel pipelaying vessel in accordance with the present invention, such a convertible maritime vessel including but not being restricted to any known form of maritime vessel constructed or adapted for pipelaying whether by reel pipelaying or otherwise.

Embodiments of the invention will now be described by way of example, with reference to the accompanying drawings wherein:

FIG. 1 is a starboard elevation of a reel pipelaying vessel in accordance with the present invention;

FIG. 2 is a plan view of the vessel of FIG. 1;

FIG. 3 is a starboard elevation (to an enlarged scale) of the stern area of the vessel of FIG. 1 with a pipe-launching stern ramp to its lowest elevation;

FIG. 4 is a stern view corresponding to FIG. 3;

FIG. 5 is a view corresponding to FIG. 3 but with the ramp at its highest elevation;

FIG. 6 is a stern view corresponding to FIG. 5;

FIG. 7 is a starboard elevation of another form of reel pipelaying vessel in accordance with the present invention;

FIG. 8 is a plan view of the main deck of the vessel of FIG. 7, ie, view with the vessel bridge and upper decks removed;

FIG. 9 is a starboard elevation of a modified version of the pipe-launching ramp and associated equipment forming part of the vessel of FIG. 7;

FIG. 10 is a starboard elevation of ramp-mounting bearings and a ramp elevation controller associated with the ramp of FIG. 9;

FIG. 11 is a front elevation of the arrangement of FIG. 10;

FIG. 12 is a view from the starboard side of the reeving arrangement of an abandonment and recovery system (A&R system) associated with the ramp of FIG. 9, shown with the ramp at its minimum elevation;

FIG. 13 is a view from above of the arrangement of FIG. 12, as seen from the direction of the arrow "P" in FIG. 12;

FIG. 14 is a cross-section of part of the arrangement of FIG. 12, taken on the line A—A in FIG. 12;

FIG. 15 is a view corresponding to FIG. 12 but with the ramp at its highest elevation;

FIG. 16 is a longitudinal section of a reel-clamping chock for use with the present invention;

FIG. 17 is an outside end view of the arrangement of FIG. 16, as viewed in the direction of the arrow "P" in FIG. 16;

FIG. 18 is an inside end view of the arrangement of FIG. 16, as viewed in the direction of the arrow "Q" in FIG. 16;

FIG. 19 is a plan view, to a much-reduced scale, of a reel-clamping chock array applied to a reel;

Figure 26:
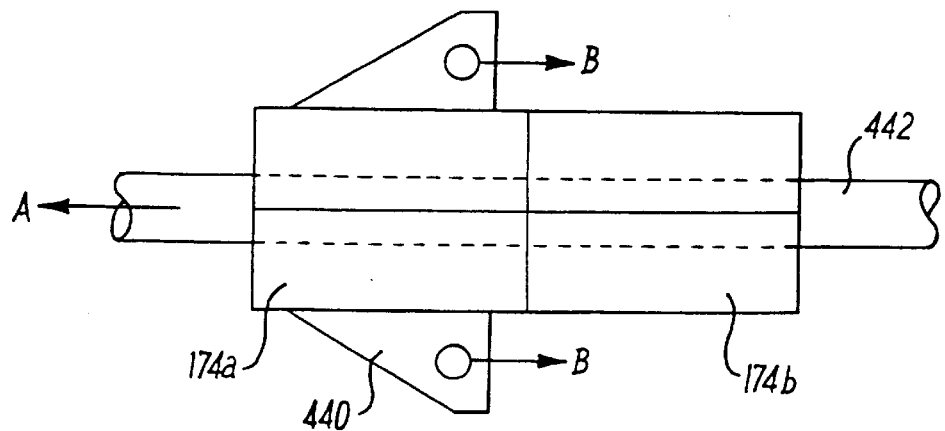
Figure 25A:
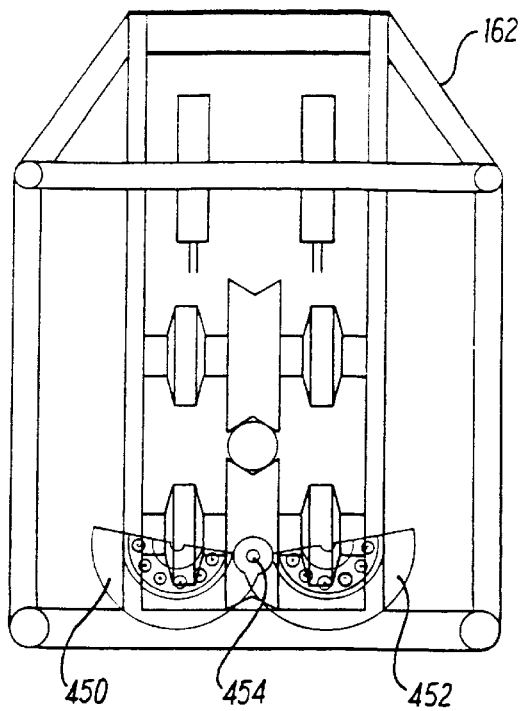

FIGS. 25(a), (b) and (c) are schematic illustrations of a preferred arrangement of a main pipeline clamp; and FIG. 26 is a schematic illustration of a particularly preferred arrangement of pipeline clamps.

Referring first to FIGS. 1 and 2, these show respectively starboard and plan views of a reel pipelaying vessel 100 which is similar in certain respects to known forms of reel pipelaying vessels, for example as disclosed in WO93/06401 and WO93/06402. However, general and particular aspects of the vessel 100 are distinctively different from the prior art, as will be detailed below.

The vessel 100, to be known as the "Stena Apache Two", is intended to be converted from the diving support vessel (DSV) "Stena Wellservicer" (not separately illustrated) by the method now to be described.

The method provides that the DSV will be transversely divided immediately astern of the forward bridge and accommodation section 102, and the sternwards section 104 separated from the forward section 102. A prefabricated hull section 106 will next be located between the forward and sternwards sections 102 and 104, and the three sections then welded together to form the basis of a vessel with an extended hull. Port and starboard sponsons 108 and 110 are subsequently attached to the outside of the vessel hull from the stern to about the middle of the forward section 102 so as to increase the displacement of the resultant vessel 100, and hence increase the vessel's load-carrying capacity. The sponsons 108 and 110 are also designed and attached such as to increase the longitudinal bending strength of the vessel 100.

The hull section 106 is formed with a reel-holding well 112. Bearing pedestals 114 and 116 are fabricated on port and starboard sides of the well 112 to form reel-mounting bearings. A main pipe-carrying reel 118 is rotatably mounted in the bearings 114 and 116. A main reel driving and braking system (not shown) is installed in the well 112.

A large auxiliary reel 120 is installed immediately forward of the main reel 118, in the redundant DSV dive system garage in the after end of the forward section 102. The large auxiliary reel 120 is intended to carry cable(s) and/or auxiliary pipes.

A small auxiliary reel 122 is installed immediately aft of the main reel 118, in the redundant DSV gas storage area in the forward end of the sternwards section 104. The small auxiliary reel 122 is intended to carry cable(s) and/or hose(s).

The stern of the vessel 100 is provided with substantially elevated ramp mountings 124 and 126. A ramp 128 in the form of a rectangular lattice has its rear end 130 rotatably mounted on the upper ends 132 and 134 of the ramp mountings 124 and 126 (see FIGS. 4 and 6).

The mountings 124 and 126 are not only shaped and dimensioned to support the ramp 128 on their upper ends 132 and 134 substantially above the vessel's main deck 136 such as to leave walk-through headroom under the ramp 128, but also to locate their upper ends 132 and 134 clear of the stern of the vessel 100 such as to enable pipe to be launched aft the ramp 128 at a near-vertical angle (see FIG. 5).

The forward end 138 of the ramp 128 is supported at a controllably variable height above the deck 136 by means of a ramp elevation controller 140 comprising a pair of rack and pinion elevators 142 and 144.

Referring to FIGS. 9 and 10, each of the ramp elevators 142 and 144 comprises an elongate rack 146 with a row of teeth along both edges, the racks 146 each being tiltably mounted on the deck 136 by means of a respective hinge 148. The use of deck-fixed hinges 148 allows the necessary reinforcements of the deck 136 to be limited to the two relatively small areas under the hinges 148, in contrast to the widespread deck reinforcement required with prior art ramp elevators (eg, the rail-mounted ramp elevators of WO93/06401 and WO93/06402).

Each of the ramp elevators 142 and 144 further comprises a power-driven pinion assembly 150 comprising a pinion frame 152 mounting three pairs of pinions 154, with one pinion of each pair engaging one of the rows of teeth on either edge of the rack 146. Each of the pinions 154 is driven by a respective hydraulic motor and reduction gear unit 156. The respective upper ends of the two pinion assemblies 150 are pivotally coupled to the forward end 138 of the ramp 128 by respective pivot couplings 158. The pinion assemblies 150 are also mutually cross-linked by a transverse frame 159.

Conjoint operation of the hydraulic drive units 156 causes the pinion assemblies 150 to crawl up/down the racks 146 hence to raise/lower the forward end 138 of the ramp 128. Control of the drive units 156 is such as to ensure (as far as possible) synchronous movement of the assemblies 150 and hence to avoid movement-induced distortion of the ramp 128 (whose structure is lighter and less rigid than the structures of the ramps described in WO93/06401 and WO93/06402). Positive synchronisation of the movements of the two pinion assemblies 150 can optionally be ensured by cross-linking at least one pinion in one assembly 150 with the corresponding pinion in the opposite assembly 150 by means of a transverse drive shaft (not illustrated) in addition to or as a substitute for use of the transverse frame 159.

With the arrangement illustrated in the accompanying drawings, the ramp 128 can be rapidly adjusted to any elevation in the range from 10° above horizontal (FIGS. 3 and 4) to 85° above horizontal (FIGS. 5 and 6). The arrangement can be modified to suit other desired ranges of ramp elevation.

The ramp 128 does not directly carry pipe being de-spooled from the main reel 118, but carries the pipe through the intermediary of a levelwind assembly 160 comprising an elongated frame 162 of rectangular cross-section (see FIG. 14). The levelwind frame 162 is mounted for ramp-traversing movement by means of rollers 164 (FIG. 9) running on the ramp crossbeams forming the ramp ends 130 and 138. The ramp crossbeams 130 and 138 are also fitted with transverse racks 166 engaged by hydraulically-powered pinion/gearbox motor units 167 for controllably displacing the levelwind assembly 160 across the ramp 128 as necessary to ensure correct spooling/de-spooling of pipe onto/off the main reel 118 (ie, to ensure "level winding").

The levelwind assembly 160 further includes various items of pipe-conditioning and pipe-handling equipment which are mounted on the frame 162 for controlling position, movement and shape of pipe passing through the levelwind assembly 160. Such equipment includes, by way of non-limiting example, a curved main aligner 168 for imparting a controlled radius to pipe being de-spooled from the main reel 118, pipeline straightening and tensioning means comprising first, second, third and fourth caterpillar track assemblies 170, 171, 172, 173, the first, second and third of said assemblies 170, 171, 172 together constituting a "three-roll" pipe straightener, and the third and fourth of said assemblies 172, 173 together constituting a pipe tensioner, at least one, and preferably a pair, of pipe clamps 174, and a roller frame 176 for pipe guidance. The items 168–176 referred to above are known per se, and are described in detail in the above-mentioned WO93/06401 and WO93/06402. Alternative types of straightener, tensioner etc. may be substituted for those described herein.

The levelwind assembly 160 may also include similar equipment for handling auxiliary pipe(s) and/or cable(s), for example an auxiliary aligner 178 and an auxiliary straightener 180.

To facilitate procedures such as pipe inspection, pipe repairs, pipe jointing, attachment/removal of haulage couplings to/from the pipe, and other tasks that have to be performed on pipe in passage through the levelwind assembly 160, the levelwind frame 162 is fitted with a pair of work platforms 182 and 184 whose inclinations on the frame 162 are selectively adjustable to allow the platforms 182, 184 to be levelled independently of the current inclination of the ramp 128 while continuing to facilitate safe and convenient access of personnel to the pipe in that region of the levelwind assembly 160. Access is conveniently enabled by a ladder system and by a man-riding lift, with a separate system on each side of the levelwind assembly 160. The levelwind frame 162 may be shrouded or boxed-in to provide full weather protection.

Occasions may arise when it is necessary or desirable to allow the end of a pipe to be let overboard in a controlled manner, or to haul the end of pipe on-board in line with the normal path of continuous pipe. To meet these requirements, the vessel 100 is rigged with an "abandonment and recovery" system (A&R system) 186 which is essentially a winch system reeved partly inside the vessel 100 and partly on the levelwind assembly 160. (The version of the A&R system 186 shown in FIG. 9 differs slightly from that shown in FIGS. 1–6, as do certain details of the levelwind system such as the forward end of the frame 162).

As part of the A&R system 186, a winch 188 is located inside the hull of the vessel 100, the winch 188 being anchored on the redundant underdeck strongpoint originally employed for mounting the DSV sterndeck crane (removed). The A&R rope 190 runs from the winch 188 round a pulley 192 anchored between the ramp mountings 124 and 126 up to a pulley or pulleys 194 anchored on the levelwind frame 162 and hence (when deployed) down the centerline of the levelwind assembly 160 along the same path as that normally taken by pipe being de-spooled from the main reel 118. When the A&R system 186 is not required to be operative the pulley or pulleys 194 is/are moved to the side of the levelwind centerline to be clear of the pipe path (see FIG. 14). The tail of the rope 190 on the non-load side of the winch 188 is carried round a pulley 196 and onto a take-up drum 198 for tangle-free storage.

The location of the pulley 192 between the ramp mountings 124 and 126 has at least two advantages, namely the closer the pulley 192 is to being coaxial with the ramp bearings 132 and 134, the closer the A&R system 186 is to being level luffing (ie, to not pulling in or paying out as the ramp elevation changes), and secondly, obstruction of the area of the deck 136 under the ramp 128 is minimised.

Between the main reel 118 and the large auxiliary reel 120 a combined pipe/cable bridge and personnel access gangway 200 is cantilevered sternwards off the rear wall of the forward vessel section 102 to pass partly over the main reel 118 at an elevation sufficient to clear pipe being de-spooled from the reel 118 into the levelwind assembly 160, whatever the current elevation of the ramp 128. The upper side of the bridge/gangway 200 is fitted with lengthwise array of transverse axis rollers 202 to carry auxiliary pipe(s)/cable(s) being de-spooled from the large auxiliary reel 120 onto the ramp 128. A pedestrian-carrying gangway (not illustrated) is mounted on the bridge/gangway 200 alongside the rollers 202 to allow access from the upper deck of the forward section 102 to a location close to and directly over the forward side of the hub of the main reel 118. The bridge/gangway 200 is held at the appropriate elevation by means of a strut 204, which may be of a fixed length to hold the bridge/gangway 200 at a corresponding fixed elevation;

alternatively, the strut 204 may be of a controllably variable length to hold the bridge/gangway at a selectively variable elevation.

Besides functioning as a combined bridge and gangway, the structure 200 gives a measure of protection to the forward section 102 and to the personnel therein, by shielding the forward section 102 from the uncontrollable and violent movement of the broken end of pipe should the pipe fracture between the reel 118 and the aligner 168, particularly if under considerable tension (which may be as high as 200 Tonnes even when operating within design limits).

The dynamic positioning system (DPS) of the original DSV "Stena Wellservicer" is retained in the reel pipelaying vessel "Stena Apache Two" ("100" in the accompanying drawings). The DPS retained in the converted vessel 100 comprises three variable-thrust 360°-steerable stern thrusters 206, and three variable-thrust unsteerable transverse-tunnel bow thrusters 208.

A crane 210 is mounted on the port rail of the vessel 100, aft of the main reel 128 and forward of the small auxiliary reel 122. In-hull foundations of the crane 210 are partly in the original DSV and partly in the conversion-added port-side sponson 108.

A crane 212 is mounted on starboard rail of the vessel 100, at the furthest stern of the main deck 136 (FIGS. 1–6 and 7–8). As with the portside crane 210, the in-hull foundations of the starboard crane 212 are partly in the original DSV and partly in the conversion-added starboard sponson 110. In order to avoid being unduly baulked by the levelwind assembly 160 at the maximum elevation of the ramp 128, it is preferred to move the starboard crane further aft from the position shown in FIGS. 1–6 to the position shown in the modified vessel of FIGS. 7 and 8, the starboard sponson 110 and the overlying portion of the main deck 136 being correspondingly extended sternwards to support the repositioned crane.

Apart from removal of the redundant dive systems, the forward vessel section 102 retains all the essential features of the forward section of the DSV; in addition to the bow thrusters 208, these retained features include the engine room (not visible), crew accommodation 214, forward bridge 216, stern bridge 218 (overlooking the main reel 118 and the pipe-launching ramp 128), and helicopter landing deck 220.

Referring now to FIGS. 16, 17 and 18, these show external and internal details of a reel-clamping chock 300.

The chock 300 comprises a cylindrical outer casing 302 which is welded to the main deck 136 through the intermediary of a pair of saddle plates 304 and longitudinal reinforcing webs 306. A longitudinally slidable sleeve 308 is mounted within the outer casing 302 by anti-friction bushes 310 and 312. The reel end of the sleeve 308 is fitted with a flanged plug 314 having an aluminium bronze pad 316 affixed to its outer face.

Extension and retraction of the chock 300 is achieved by a hydraulic cylinder 318 and piston 320 mounted within the sleeve 308. (Hydraulic fluid connections are omitted from FIGS. 16–18 for clarity). The end of the hydraulic cylinder 318 remote from the reel-contacting end of the chock 300 is anchored to the casing 302 and hence to the deck 136 by a cylinder eye 322 pinned between a pair of U-brackets 324 fixed to the end of the casing 302 by fasteners 326.

The piston 320 is coupled to the reel-contacting end of the chock by a piston eye 328 being pinned to a clevis fitting 330 secured to one end of a pushrod 332. The other end of the pushrod 332 is secured to the inner face of the plug 314.

The reel end of the sleeve 308 is externally screw-threaded with an Acme thread 334. An internally threaded ring 336 is fitted on the sleeve thread 334 such that the ring 336 can be selectively positioned along the outer end of the sleeve 308 by manually turning the ring 336 around the sleeve 308. The periphery of the ring 336 is drilled with radial holes 338 to enable the ring 336 to be turned by a suitable tool (not shown).

FIG. 16 shows the chock 300 fully extended such that the pad 316 forcibly-engages an annular contact surface 222 on the outside end face of the main reel 118. FIG. 15 also shows the ring 336 screwed up against the adjacent end of the sleeve 308 such that reel-clamping forces continue to be applied to the reel 118 even if hydraulic pressure is removed from the cylinder and piston 318 and 320, due to the mechanical locking of the chock 300 provided by suitably turning the ring 336 on the sleeve thread 334.

Release of the reel-clamping chock 300 from the fully-applied position shown in FIG. 16 is achieved by unscrewing the ring 336 until it is clear of the sleeve 308, then applying reversed hydraulic pressure to the cylinder 318 and piston 320 to pull the movable end of the chock 300 away from the main reel 118.

Hydraulic pressure is preferably applied in the reel-clamping direction prior to and during unscrewing of the ring 336 in order to relieve the ring 336 of loading which might otherwise hinder or prevent the ring 336 being turned.

FIG. 19 is a plan view, to a much reduced scale, of a preferred arrangement for sea fastening, ie, for clamping the main reel 118 against axial movement when not spooling or de-spooling (eg, during transit to or from a pipe-laying location, or when pipelaying is suspended due to bad weather). An array of four chocks 300 (each as shown in FIGS. 16–18) is secured to the main deck 136 around the lip of the reel-holding well 112. One pair of the chocks 300 is disposed to engage the port side of the main reel 118, and the other pair of chocks 300 is disposed to engage the starboard side of the main reel 118. Within each of these pairs of chocks 300, one chock is located on one side of the reel axis and the other chock is located on the other side of the reel axis, as shown in FIG. 19. This symmetrical array of reel-clamping chocks ensures inherent equalisation of reel-clamping forces on the reel when the chocks are fed from a common hydraulic supply, thus avoiding any tendency for the chocks to induce skewing of the main reel 118.

Other arrangements of reel-clamping chocks are possible within the scope of the invention, for example different locations for the chocks and/or different numbers of chocks. Reel-clamping chocks may also be provided for the large auxiliary reel 120 and/or for the small auxiliary reel 122.

Figure 20:
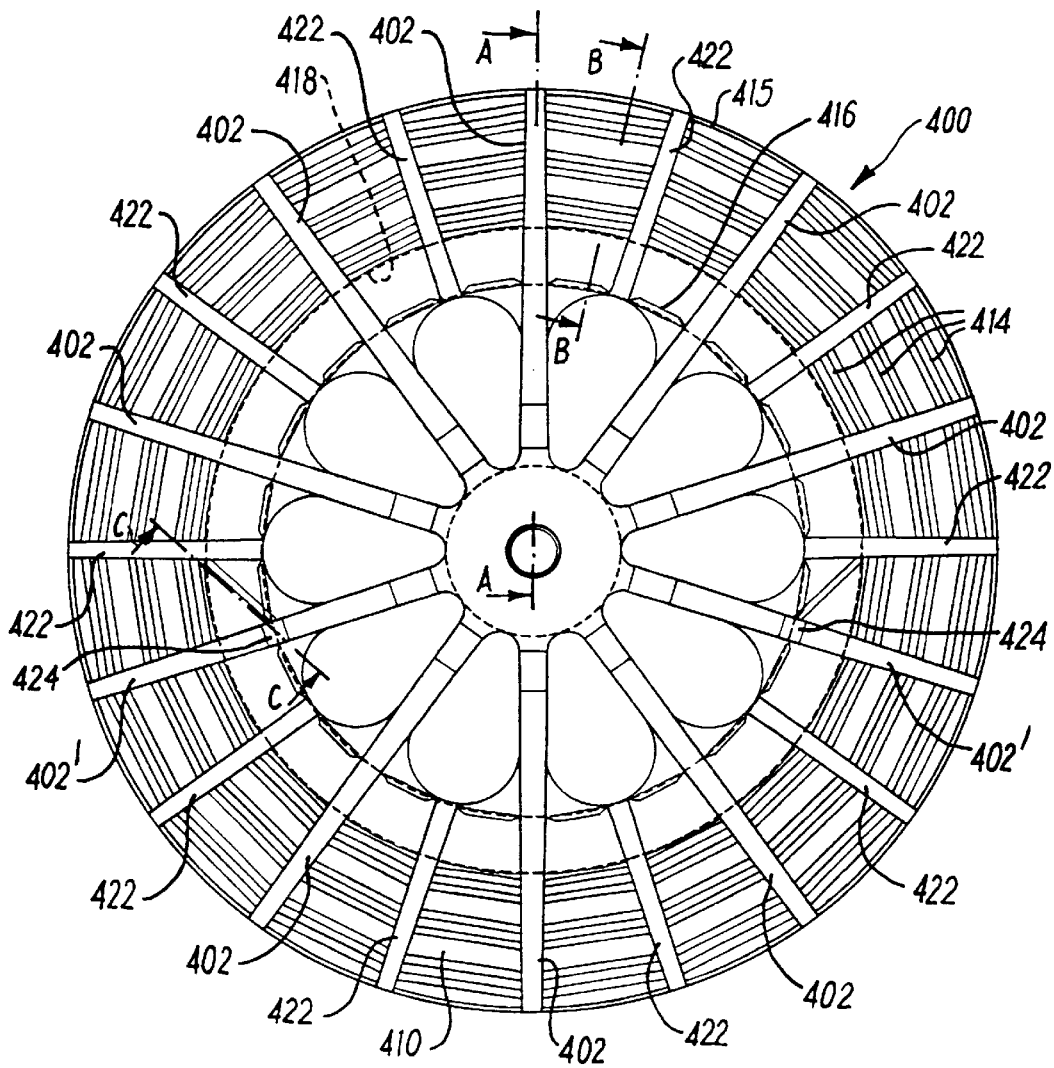
FIG. 20 is a side view of a preferred embodiment of a main reel for use with the vessel of FIGS. 1 to 19.
Figure 21:
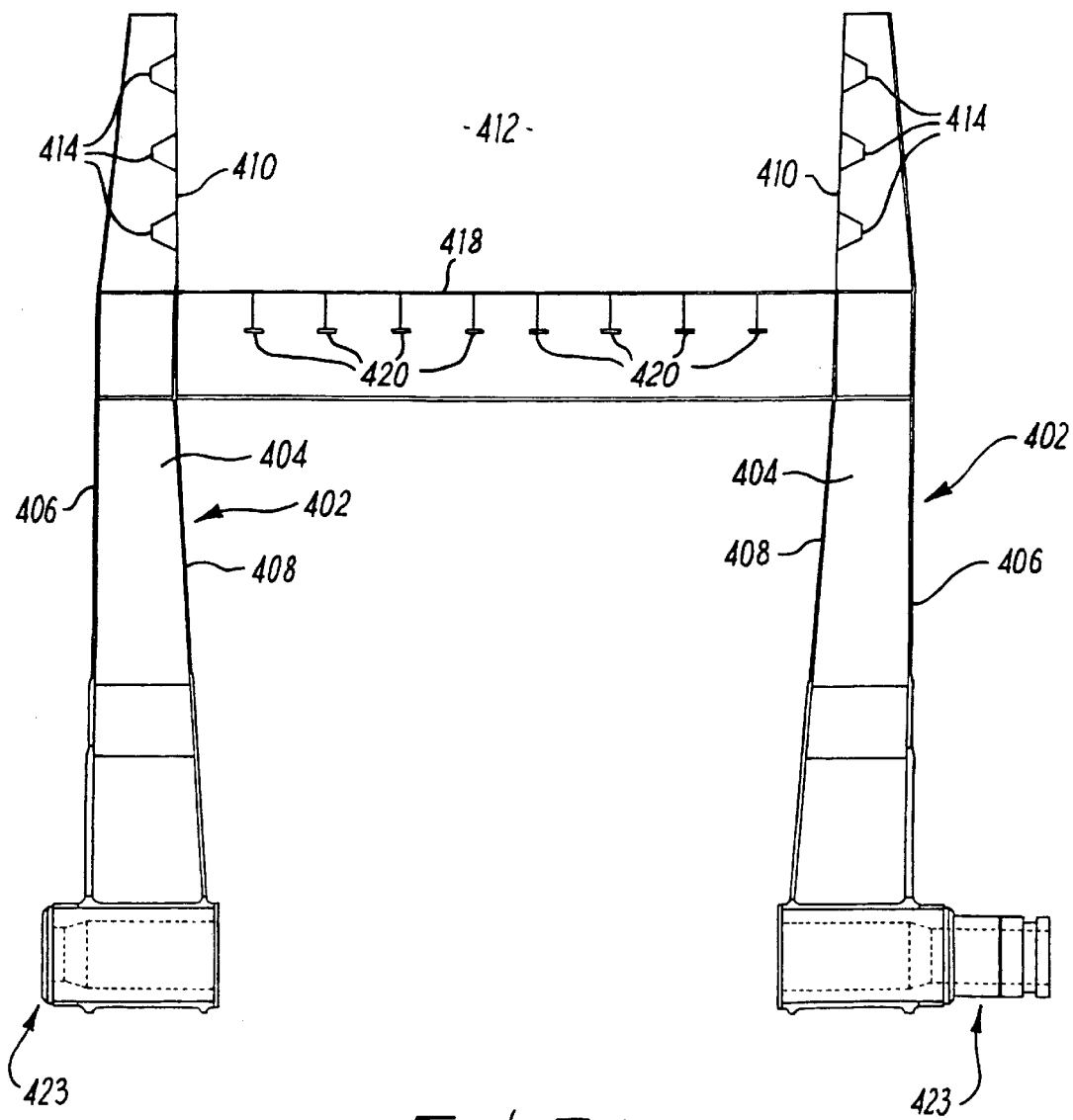
FIG. 21 is a sectional view on line A—A of FIG. 20.
Figure 22:
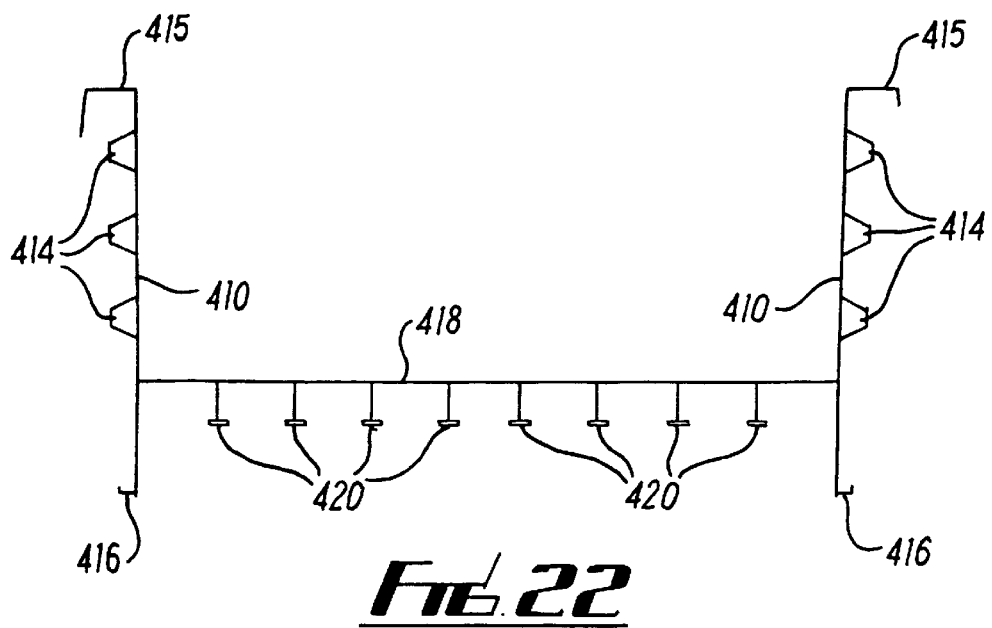
FIG. 22 is a sectional view on line B—B of FIG. 20.
Figure 23:
FIG. 23 is a sectional view on line C—C of FIG. 20.

FIGS. 20 to 23 show a preferred embodiment of the main reel 400 of a reel pipelaying vessel such as that described herein. FIG. 20 shows a side view of the reel 400, whilst FIGS. 21 to 23 show sectional views on lines A—A, B—B and C—C of FIG. 20 respectively.

The reel 400 is of a generally open construction to minimise its weight, and is formed largely from plate steel. A plurality of main spokes 402 extend radially outwards from the centre of the reel 400 and have an I-beam type configuration comprising a main planar member 404 and outer and inner planar flanges 406, 408. The outer ends of the spokes 402 are connected by flange plating 410 which form the sides of the pipe-receiving well 412 of the reel 400. The flange plating 410 is strengthened by trapezoidal box-section stiffeners 414. The outer and inner edges of the flange plating 410 are further strengthened by knuckles 415, 416. The floor of the well 412 is formed by hub plating 418, which is braced by internal stiffeners 420. Intermediate partial spokes 422 are located between each pair of main spokes 402, extending across the width of the flange plating 410.

As seen in cross section in FIG. 21, the reel has a "portal frame" configuration, without a main shaft connecting the main rotary bearings 423. This configuration improves the fatigue performance of the reel by removing the additional rigidity and associated stresses caused by the presence of a continuous shaft as in the original Apache vessel.

In this example, the reel 400 is adapted to be engaged by sea-fastening chocks, as previously described above, at portions 424 of two of the main spokes 402' on each side of the reel 400. A bracing flange 426 extends diagonally between a point adjacent the portion 424 of each of the spokes 402' and the adjacent intermediate spoke 422. The portions 424 may be formed as anti-friction pads similar to those of the chocks as previously described. This arrangement allows the chocks to be applied to the reel only when the reel is at a particular angular position. Accordingly, when the chocks are to be applied, it may be necessary firstly to rotate the reel 400 so as to align the portions 424 with the chocks.

Figure 24:
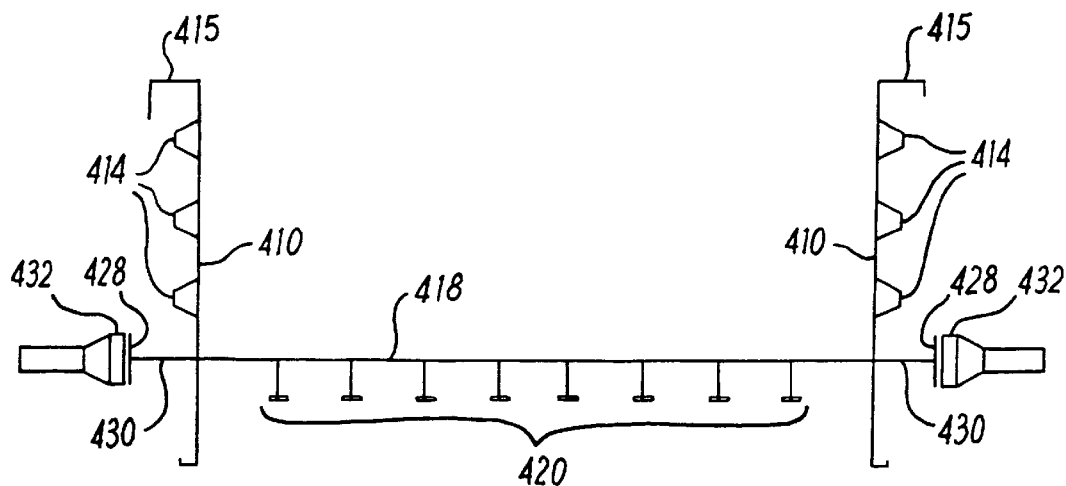
FIG. 24 is a view similar to FIG. 23, showing a modified chocking arrangement.

FIG. 24 illustrates an alternative arrangement, whereby the chocks may be applied to the reel at any position. In this case a continuous, annular chock bearing surface 428 extends around the reel, mounted on an extension 430 of the hub plating 418. As is also illustrated schematically in FIG. 24, the contact shoe 432 of the chock may be enlarged in size, in comparison with the previously described embodiment of the chock, presenting a greater contact surface area such that the bearing surface 428 of the reel can be made generally lightweight in construction.

FIGS. 25(a), (b) and (c) and FIG. 26 illustrate a preferred arrangement of the pipe clamps 174 previously referred to. FIGS. 3 and 9 show the use of first and second pipe clamps 174 located on the pipeline path near the aft end of the levelwind frame 162. Firstly, it is preferred that the clamps 174 have a generally cylindrical configuration as shown in FIG. 25, being formed from first and second semi-cylindrical portions 450, 452 hinged together along their lengths at 454 below the pipeline path. Secondly, it is preferred that the clamps be mounted so as to be retractable out of the pipeline path when not in use (as shown in FIG. 25(a)). Thirdly, it is preferred that one of the clamps (most preferably the uppermost clamp closest to the tensioner 172,173) is removable. The maximum clamping force provided by the two clamps is only likely to be required in a minority of cases. Accordingly, it desirable that the second clamp be removable to provide a greater work space when it is not required for a particular operation. If the second clamp is removable, then only a single retractable mounting need be provided for the first clamp. The mounting will be constructed to be capable of taking the total design load of both clamps, and the second clamp may simply be attached to the pipe immediately above the first clamp. This arrangement is schematically illustrated in FIG. 26, where the first clamp is designated 174a, the second clamp is designated 174b, the mounting, partially hidden beneath the first clamp, is designated 440, and the pipeline 442 is being unspooled in the direction of the arrow A, the load on the clamp mounting 440 being in the direction of the arrows B.

Figure 25B:
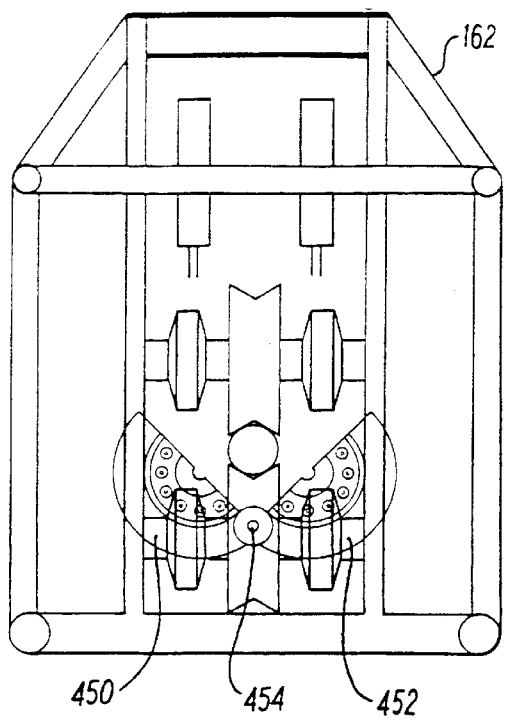
Figure 25C:
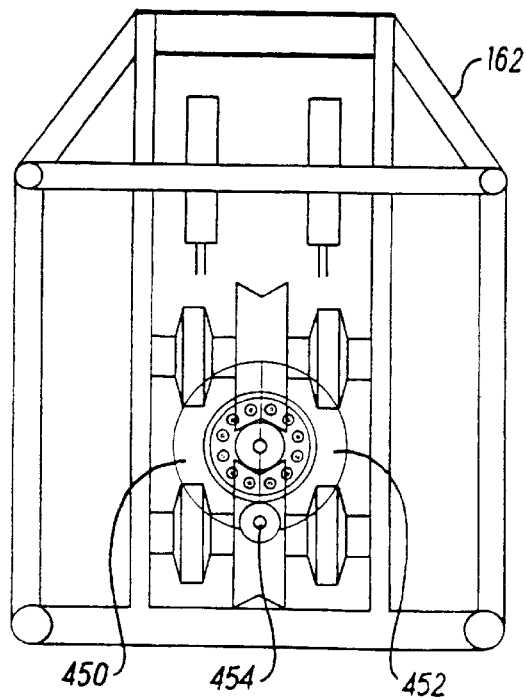

The clamps may be of the type having a rubber lining and hydraulic packers as is known in the art. FIG. 25(c) shows the clamp extended and closed to engage the pipeline, and FIG. 25(b) shows the clamp in an intermediate position between the retracted/open position of FIG. 25(a) and the extended/closed position of FIG. 25(c).

While preferred embodiments of the invention have been described above, the invention is not restricted to these forms, and modifications and variations of these embodiments can be adopted without departing from the scope of the invention.

We claim:

1. A reel pipelaying vessel, said vessel being fitted with a dynamic positioning system, said vessel being provided with a reel-holding well at a location amidships, said vessel being provided with reel-mounting bearings on laterally opposite sides of said well, and said vessel being provided with ramp-mounting bearings at a sternwards location on said vessel for the mounting of a pipe-launching ramp thereon, wherein said reel pipelaying vessel further comprises a pipe-launching ramp temporarily or permanently mounted on said ramp-mounting bearings, wherein the mounting of said ramp on said ramp-mounting bearings is a rotational mounting whereby the elevation of the ramp with respect to the vessel is variable, said ramp having bearing means at or toward a first end thereof whereby the ramp is rotatably coupled to said ramp-mounting bearings, said vessel further comprising ramp elevation control means for controllably varying the elevation of the ramp by rotating an aft end of the ramp about said rotational mountings, wherein said ramp includes first coupling means located at or toward a second end of the ramp for coupling of the ramp to said ramp elevation control means, and wherein said ramp elevation control means comprises variable-length ramp support means anchored at or adjacent one end thereof upon fixed structure of the vessel and at or adjacent the other end of a variable length portion of the support to the ramp at a location thereon not adjacent said rotational mounting of said ramp, said ramp elevation control means having second coupling means for coupling said ramp support means to the first coupling means or said ramp, the distance between the second coupling means and the first end of said ramp support means being variable so as to vary the elevation of the first end of the ramp; wherein said variable-length ramp support means comprises a pair of rack and pinion elevators, each comprising an elongated rack member and a pinion assembly, one of each pair located one on each side of said ramp and conjointly operable to vary the elevation of said first end of said ramp, and second coupling means being provided on said pinion assemblies.

2. A reel pipelaying vessel as claimed in claim 1, wherein said pipe-launching ramp comprises a pipe radius control means for imparting a substantially uniform radius control means for imparting a substantially uniform radius of curvature to a length of pipe despooled from said reel in pipelaying operation of said vessel.

3. A reel pipelaying vessel as claimed in claim 1, wherein said pipe-launching ramp comprises level-wind means for accommodating variations in the lateral positioning of a length of pipe spooled onto said reel as a plurality of side-by-side turns, during spooling and de-spooling of said length of pipe.

4. A reel pipelaying vessel as claimed in claim 3, wherein said level-wind means and said pipe radius control means are mounted and controlled for conjoint lateral movement.

5. A reel pipelaying vessel as claimed in claim 5, wherein said pipe radius control means is mounted upon said level-wind means for carriage thereby.

6. A reel pipelaying vessel as claimed in claim 3, wherein said ramp includes at least two levelwind-mounting crossbeams, said levelwind means comprising a rectangular lattice mounted for lateral movement on said crossbeams, lateral movement control means for laterally moving said lattice on said crossbeams, radius control means carried on said lattice for imparting a uniform curvature to a pipe being despooled over said ramp, and pipe gripping means carried by said lattice for ripping a pipe being de-spooled over said ramp to apply straightening and tensioning forces to said pipe.

7. A reel pipelaying vessel as claimed in claim 6, wherein the lattice is boxed in or surrounded to provide full weather protection.

8. A reel pipelaying vessel as claimed in claim 6, wherein the lattice is equipped with a dual bulkhead/platform system to provide a working location which allows personnel to work on the lattice whether the ramp is near horizontal or near vertical.

9. A reel pipelaying vessel as claimed in claim 1, including a pipe-spooling reel, wherein said pipe-spooling reel includes first and second lateral side portions each comprising a central rotary bearing, a plurality of radial spokes extending outwardly from said central rotary bearing and a main flange surface connecting at least the outer portion of said spokes, the reel further including a hub surface connecting said lateral side portions such that said reel, in radial cross-section, has a portal frame configuration, there being no central shaft connecting the rotary bearing of the respective side portions.

10. A reel pipelaying vessel as claimed in claim 1, further including pipeline clamping means located adjacent the aft end of a pipe-launching ramp, said clamping means comprising at least a first clamp of generally cylindrical configuration mounted on said ramp by clamp mounting means, said first clamp comprising first and second semi-cylindrical portions hinged together along their lengths on a side of the clamp disposed below the pipeline path, and wherein said clamp mounting means has a load capacity greater than the load capacity of said first clamp, whereby the clamp load capacity may be increased up to the capacity of said clamp mounting means by securing one or more additional clamps to the pipeline in abutment with the first clamp and, upstream therefrom in the direction of pipeline unspooling.

11. A reel pipelaying vessel as claimed in claim 10, wherein said clamp mounting means is adapted to be retractable such that said first clamp may be retraced to a position below the pipeline path when not in use.

12. A reel pipelaying vessel as claimed in claim 1, wherein said pipe-launching ramp further includes pipe gripping means for gripping a pipe being de-spooled over said ramp to apply straightening and tensioning forces to said pipe.

13. A reel pipelaying vessel, said vessel being fitted with a dynamic positioning system, said vessel being provided with a reel-holding well at a location amidships, said vessel being provided with reel-mounting bearings on laterally opposite sides of said well, said vessel being provided with ramp-mounting bearings at a sternwards location on said vessel for the mounting of a pipe-launching ramp thereon and further comprising a pipe-launching ramp temporarily or permanently mounted on said ramp-mounting bearings, wherein the mounting of said ramp is a rotational mounting whereby the elevation of the ramp with respect to the vessel is variable and said vessel further comprises ramp elevation control means for controllably varying the elevation of the ramp, and wherein the combination of said pipe-launching ramp and said ramp-mounting bearing is such that the underside of said pipe-launching ramp is clear of underlying deck of the reel pipelaying vessel, at least between said ramp-mounting bearings and such part or parts of the deck at which said-ramp elevation control means is anchored.

14. A reel pipelaying vessel as claimed in claim 13, wherein the deck to ramp underside clearance is preferably at least sufficient to constitute walk-under headroom.

15. A reel pipelaying vessel as claimed in claim 13, wherein said ramp-mounting bearings are arranged to dispose a horizontal pivot axis for the ramp substantially above said underlying deck whereby thus to provide at least the greater part of said clearance.

16. A reel pipelaying vessel as claimed in claim 13, wherein said ramp elevation control means comprises variable-length ramp support means anchored at or adjacent one end thereof upon fixed structure of the vessel and at or adjacent the other end of a variable length portion of the support to the ramp at a location thereon not adjacent said rotational mounting of said ramp.

17. A reel pipelaying vessel as claimed in claim 16, wherein said variable-length ramp support means comprises a pair of rack and pinion elevators, one of each pair located on each side of said ramp and conjointly operable to vary the elevation of said ramp with respect to said vessel.

18. A reel pipelaying vessel, said vessel being fitted with a dynamic positioning system, said vessel being provided with a reel-holding well at a location amidships, said vessel being provided with reel-mounting bearings on laterally opposite sides of said well, and said vessel being provided with ramp-mounting bearings at a sternwards location on said vessel for the mounting of a pipe-launching ramp thereon, wherein said reel pipelaying vessel is provided with restrain means selectively operable on at least a main pipe reel to provide at least lateral restraint of said main reel while said main reel is not required to rotate, whereby to relieve the reel bearings of at least some lateral loading when said restraint means is applied.

19. A reel pipelaying vessel as claimed in claim 18, wherein said restraint means comprises an array of chocks which can be selectively pressed against or retracted from opposite sides of the reel on either side of the rotation axis thereof whereby selectively to apply lateral clamping forces on the reel.

20. A reel pipelaying vessel as claimed in claim 19, wherein each chock comprises a hydraulically extendable strut lockable in its extended condition by means of a screw-threaded fastener.

21. A reel pipelaying vessel as claimed in claim 19, wherein each said chock is anchored at one end thereof to at least one of the reel-holding well and to vessel decking adjacent thereto.

22. A reel pipelaying vessel as claimed in claim 21, wherein each said chock is preferably provided at the other end thereof with a reel-contacting surface of reduced friction.

23. A reel pipelaying vessel as claimed in claim 19, wherein said reel is adapted to be engaged by said chocks at a plurality of predetermined locations.

24. A reel pipelaying vessel as claimed in claim 19, wherein said reel is provided with a continuous, annular bearing surface on either lateral side thereof, said bearing surface being adapted to be engaged by said chocks at any portion thereof regardless of the rotational position of the reel.

25. A reel pipelaying vessel as claimed in claim 19, wherein each of said chocks comprises a power-extendable jack, selectively operable locking means for locking said jack in an extended configuration thereof, coupling means at one end of the chock for coupling that end of the chock to an anchorage, and reel contacting means at the other end of the chock for the application of jacking force to said reel.

26. A reel pipelaying vessel as claimed in claim 25, wherein said power-extendable jack is a hydraulic jack.

27. A reel pipelaying vessel as claimed in claim 25, wherein said selectively operable locking means comprises a screw-threaded nut or an internally screw-threaded ring which can be screwed along one part of said jack, after extension of said jack, to bear against another part of said jack which has been extended relative to said one part of said jack whereby to lock said two parts against relative movement tending to reverse such extension.

28. A reel pipelaying vessel as claimed in claim 25, wherein said reel-contacing means comprises a friction-reducing means for contacting the reel in use for the chock.

29. A reel pipelaying vessel as claimed in claim 28, wherein said friction-reducing means comprises a bronze pad attached to or integral with said other end of the chock.

30. A reel pipelaying vessel as claimed in claim 11, said array of chocks comprising at least four reel-clamping chocks disposed so that a respective plurality of said chocks is extendable to contact each of the axially opposite ends of the reel, with at least one chock in each said plurality being disposed to be extendable to contact the respective end of the reel at a location thereon which is substantially diametrically opposite to a location on that end of said reel to which at least one other chock in the same plurality is extendable to contact that end of said reel, wherein said array may be operated in a manner to reduce or eliminate skewing forces imposed on said reel by application thereto of reel-clamping force.

31. A reel pipelaying vessel, said vessel being fitted with a dynamic positioning system, said vessel being provided with a reel-holding well at a location amidships, said vessel being provided with reel-mounting bearings on laterally opposite sides of said well, and said vessel being provided with ramp-mounting bearings at a sternwards location on said vessel for the mounting of a pipe-launching ramp thereon, wherein said reel pipelaying vessel is provided with one or more auxiliary reels for the spooling/de-spooling of at least one of cable(s) and auxiliary pipe(s), wherein at least one auxiliary reel is located forward of the main pipe reel, and wherein said pipelaying vessel is provided with a bridging structure leading auxiliary pipe/cable to/from the at least one auxiliary reel from/to the pipe-launching ramp in a path extending over and clear of the path of pipe between said ramp and the main reel.

32. A reel pipelaying vessel as claimed in claim 31, wherein said fixed cantilever or other bridging structure is provided with an array of rollers or other suitable means for facilitating passage of the auxiliary pipe/cable thereover.

33. A reel pipelaying vessel as claimed in claim 31, wherein said auxiliary reel(s) are laterally aligned with the main pipe reel, and located substantially on the longitudinal centre-line of the vessel fore or aft of the main pipe reel.

34. A reel pipelaying vessel as claimed in claim 31, wherein, where the auxiliary reel or at least one of the auxiliary reels carries or is intended to carry a plastically deformable auxiliary pipe or cable, the pipe-launching ramp is formed with or provided with a respective auxiliary radius control means for imparting a substantially uniform radius of curvature to said auxiliary pipe or cable.

35. A reel pipelaying vessel, said vessel being fitted with a dynamic positioning system, said vessel being provided with a reel-holding well at a location amidships, said vessel being provided with reel-mounting bearings on laterally opposite sides of said well, and said vessel being provided with ramp-mounting bearings at a sternwards location on said vessel for the mounting of a pipe-launching ramp thereon, wherein the vessel is further equipped with an abandonment and recovery system comprising a winch arrangement extending a haulage wire from a suitably located winch by way of one or more sheaves to extend down a pipe-launching ramp so as to enable the end of a pipe being laid to be let overboard in a controllable fashion, and to facilitate the pulling on-board of a pipe end, wherein a winch haulage drum is anchored within the vessel forward of the ramp-mounting bearings, and wherein the winch arrangement includes one sheave located adjacent the ramp-mounting bearings to give the abandonment and recovery system a measure of level luffing, and at least one further sheave disposed on the ramp at a location substantially displaced from the sternwards end of the ramp, said haulage wire extending aft from said winch haulage drum, around said one sheave, forward from said one sheave and around said further sheave to bring the haulage wire into a path extending down the ramp from said location on the ramp.

36. A reel pipelaying vessel as claimed in claim 35, wherein the sheaves have articulated anchorage to cope with level winding traverses and variable ramp elevations.

37. A reel pipelaying vessel as claimed in claim 35, wherein the sheaves are wide-bodied to allow the passage of wife rope fittings and shackles incorporated into the abandonment and recovery system.

* * * * *